(12) United States Patent
McAuliff

(10) Patent No.: US 8,408,623 B1
(45) Date of Patent: Apr. 2, 2013

(54) VEHICLE WITH MULTIPLE ELEVATION REMOVABLE HARD TOP AND SECURE STORAGE UNDERNEATH

(71) Applicant: Patrick Albert McAuliff, Marysville, CA (US)

(72) Inventor: Patrick Albert McAuliff, Marysville, CA (US)

(*) Notice: Subject to any disclaimer, the term of this patent is extended or adjusted under 35 U.S.C. 154(b) by 0 days.

(21) Appl. No.: 13/659,627

(22) Filed: Oct. 24, 2012

Related U.S. Application Data

(60) Provisional application No. 61/591,860, filed on Jan. 28, 2012.

(51) Int. Cl.
*B60J 7/11* (2006.01)

(52) U.S. Cl. .......... 296/24.33; 296/26.08; 296/210; 296/218

(58) Field of Classification Search ........ 296/24.33, 296/24.43, 102, 103, 99.1, 218, 193.04, 193.12, 296/26.01, 26.03, 26.08, 26.12, 121, 107.08, 296/136.04–136.06, 210
See application file for complete search history.

(56) References Cited

U.S. PATENT DOCUMENTS

| | | | |
|---|---|---|---|
| 1,786,693 A | 12/1930 | Blass | |
| 1,924,030 A | 8/1933 | Elser | |
| 2,591,380 A * | 4/1952 | Schreiner | 296/186.5 |
| 3,175,858 A | 3/1965 | Dehn | |
| 3,198,571 A | 8/1965 | Majeski | |
| 3,298,731 A * | 1/1967 | Sangimino | 296/99.1 |
| 3,419,304 A * | 12/1968 | Sangimino | 296/99.1 |
| 3,741,605 A * | 6/1973 | Lee | 296/10 |
| 3,823,977 A | 7/1974 | Fioravanti | |
| 4,221,423 A * | 9/1980 | Stone | 296/100.09 |
| 4,712,827 A * | 12/1987 | Jensen | 296/99.1 |
| 4,750,778 A | 6/1988 | Hoban | |
| 4,799,726 A | 1/1989 | Scott | |
| 4,842,326 A * | 6/1989 | DiVito | 296/193.04 |
| 5,031,949 A | 7/1991 | Sorimachi et al. | |
| 5,056,857 A | 10/1991 | Ney et al. | |
| 5,725,273 A | 3/1998 | Vernon et al. | |
| 5,738,405 A * | 4/1998 | Richters et al. | 296/193.03 |
| 5,784,769 A | 7/1998 | Clare | |

(Continued)

FOREIGN PATENT DOCUMENTS

| | | |
|---|---|---|
| DE | 19616118 A1 | 10/1997 |
| DE | 10028777 A1 | 1/2002 |

(Continued)

OTHER PUBLICATIONS

English language abstract for DE10028777.

(Continued)

*Primary Examiner* — Glenn Dayoan
*Assistant Examiner* — Gregory Blankenship
(74) *Attorney, Agent, or Firm* — Patent and Licensing LLC; Daniel W Juffernbruch

(57) ABSTRACT

A vehicle body with multiple elevation hard top has storage underneath and is capable of driving with the hardtop present or removed. A front passenger compartment has a front rooftop and a pair of rear quarter panel sides enclosing a rear of the vehicle body. A pair of removable side sections is disposed on and above respective of the two rear quarter panel sides and further enclosing the rear of the vehicle body. A hard rooftop is capable of setting upon and connecting to either one of said pair of removable side sections or the pair of rear quarter panel sides. A storage compartment is created underneath the hard rooftop and between the pair of rear quarter panel sides. The storage compartment is capable of holding at least said pair of removable side sections and also roof tops and the rear glass.

30 Claims, 22 Drawing Sheets

U.S. PATENT DOCUMENTS

| | | | |
|---|---|---|---|
| 6,305,740 B1 | 10/2001 | Staser et al. | |
| 6,435,606 B1 | 8/2002 | Miklosi et al. | |
| 6,517,135 B2 * | 2/2003 | de Gaillard | 296/26.09 |
| 6,623,064 B2 * | 9/2003 | Schutt et al. | 296/108 |
| 6,641,201 B1 | 11/2003 | Pietryga et al. | |
| 6,773,056 B2 * | 8/2004 | Fischer et al. | 296/190.08 |
| 6,789,830 B2 | 9/2004 | Van Bussel | |
| 6,851,739 B2 | 2/2005 | Morley | |
| 6,890,014 B1 * | 5/2005 | King et al. | 296/26.09 |
| 6,929,301 B2 * | 8/2005 | Kim et al. | 296/24.33 |
| 7,093,873 B2 * | 8/2006 | Nilsrud et al. | 296/37.14 |
| 7,240,960 B2 * | 7/2007 | Fallis et al. | 296/218 |
| 7,293,822 B1 | 11/2007 | Winter, IV | |
| 7,325,475 B2 * | 2/2008 | Long | 89/36.08 |
| 7,367,615 B1 | 5/2008 | Fallis et al. | 296/220.01 |
| 7,399,030 B2 | 7/2008 | Reitzloff et al. | |
| 7,410,198 B1 * | 8/2008 | Queener et al. | 296/24.33 |
| 7,722,103 B2 | 5/2010 | Brandel et al. | |
| 7,815,253 B2 | 10/2010 | Kanamori | |
| 7,914,064 B2 * | 3/2011 | Joab | 296/100.03 |
| 7,967,365 B2 | 6/2011 | Gerhardt et al. | |
| 8,256,819 B1 * | 9/2012 | Gregory | 296/37.6 |
| 2001/0040394 A1 | 11/2001 | DeGaillard | |
| 2002/0008396 A1 | 1/2002 | De Gaillard | |
| 2002/0079718 A1 * | 6/2002 | Neubrand | 296/99.1 |
| 2002/0084678 A1 | 7/2002 | Schutt et al. | |
| 2003/0085586 A1 * | 5/2003 | Kiousis et al. | 296/102 |
| 2003/0164622 A1 | 9/2003 | De Gaillard | |
| 2003/0168880 A1 * | 9/2003 | Burkel et al. | 296/103 |
| 2004/0051347 A1 | 3/2004 | Manders et al. | |
| 2004/0090092 A1 * | 5/2004 | de Gaillard et al. | 296/222 |
| 2004/0096593 A1 | 5/2004 | Lukas et al. | |
| 2005/0134096 A1 | 6/2005 | Fallis, III et al. | |
| 2005/0230988 A1 | 10/2005 | Kim et al. | |
| 2006/0119124 A1 | 6/2006 | Briggs | |
| 2007/0164587 A1 * | 7/2007 | Brockhoff | 296/218 |
| 2012/0139282 A1 * | 6/2012 | Gu | 296/63 |

FOREIGN PATENT DOCUMENTS

| | | |
|---|---|---|
| DE | 102004002819 A1 | 8/2005 |
| DE | 102009037786 A1 | 2/2011 |
| FR | 2544682 A1 | 10/1984 |
| FR | 2824300 A1 | 11/2002 |
| FR | 2902045 A1 | 12/2007 |

OTHER PUBLICATIONS

English language abstract for DE102004002819.
English language abstract for DE102009037786.
English language abstract for DE19616118.
English language abstract for FR 2544682.
English language abstract for FR 2824300.
English language abstract for FR 2902045.

* cited by examiner

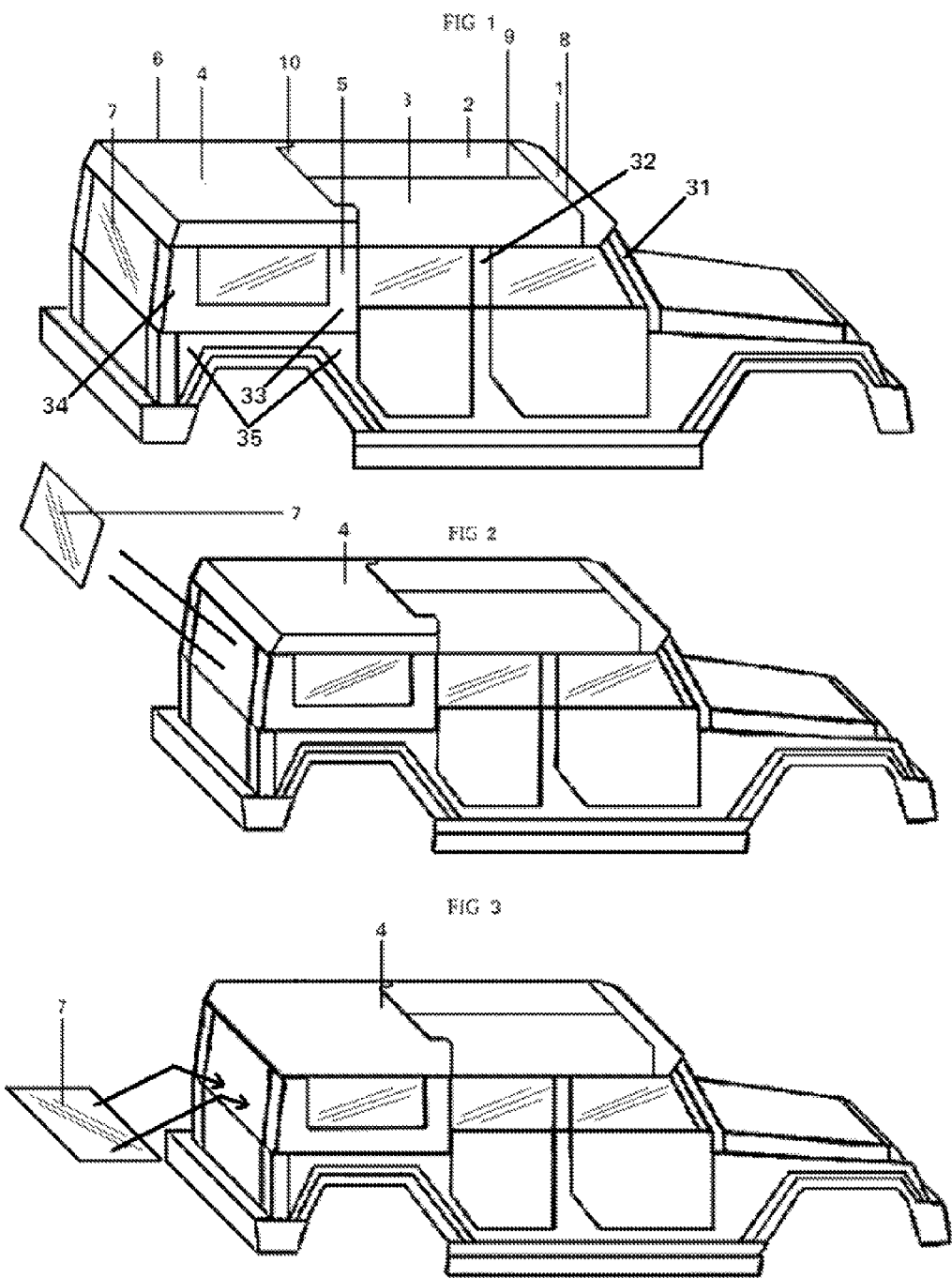

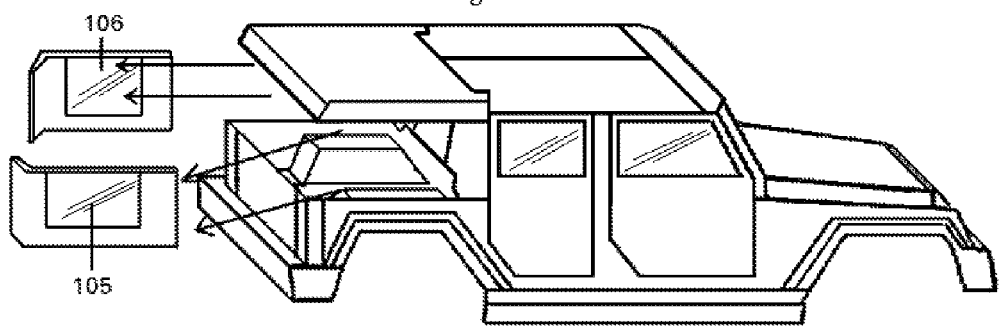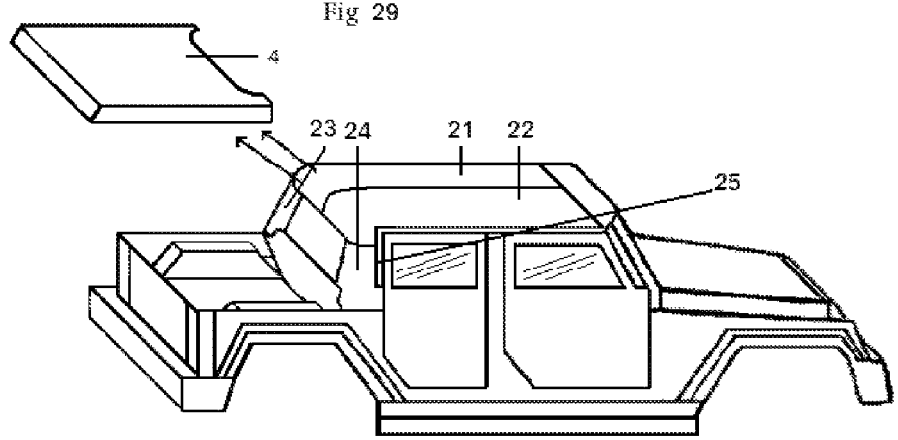

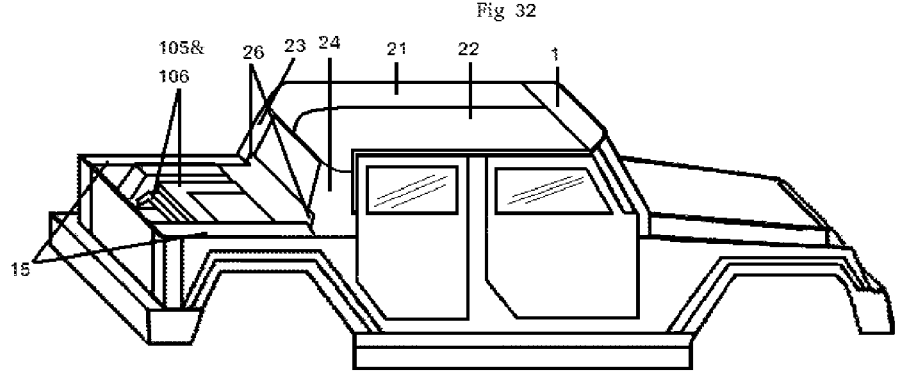
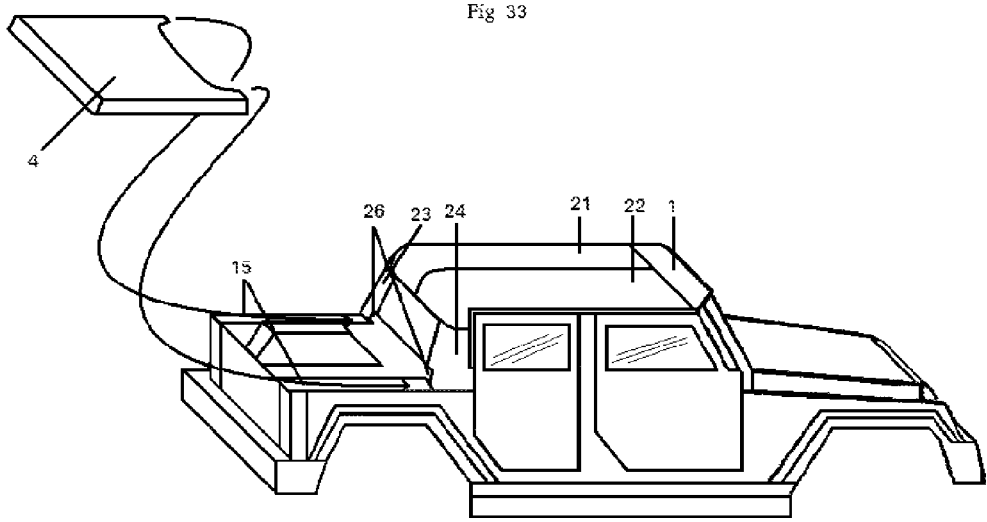
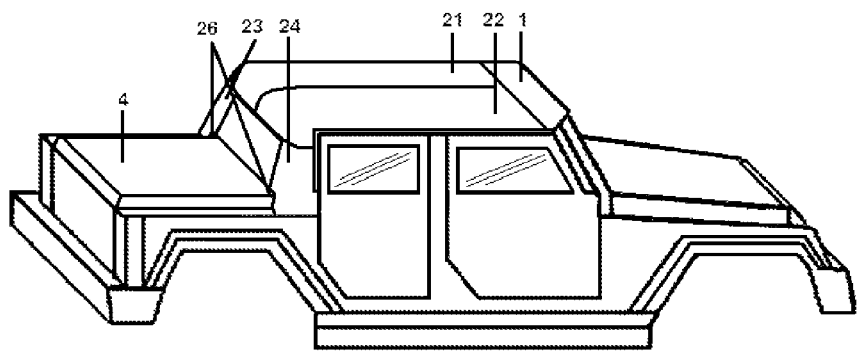

VEHICLE WITH MULTIPLE ELEVATION REMOVABLE HARD TOP AND SECURE STORAGE UNDERNEATH

BACKGROUND OF THE INVENTIONS

1. Technical Field

The present inventions relate to a top for a vehicle and, more particularly, relate to a top of a vehicle that can be adjusted in elevation and can be removed from the vehicle.

2. Description of the Related Art

Some known vehicle hard tops are known with the ability to take the whole roof sections off and storing them in your garage or other building.

When the roof sections are stored in your garage or other building, they are unavailable during a trip in case it rains or they need to be replaced to lock the vehicle.

Soft tops are easier to store in a vehicle and generally quick to open and close. Soft tops have disadvantages such as; flapping, wind noise, tearing etc. and less secure vehicle locking. A hard top is needed with the same advantages of a soft top and none of these disadvantages.

In the known tops, when you remove the top, there is no safe place to store anything inside the vehicle, except in a locked console or glove box, neither option being very large or secure. Even when considering utility vehicles with a hard metal roof, you can see inside the entire vehicle, giving you little security. Though some have the security covers, all thieves know if you have the cover pulled over, you probably have something under it of value, which leaves you vulnerable.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein:

FIG. 1 illustrates an isometric view of a utility vehicle with a hard top on, including all of its separate sections numbered according to embodiments of the present inventions;

FIG. 2 illustrates removing the rear window, according to embodiments of the present inventions;

FIG. 3 illustrates how the rear window could be stored in the rear compartment of the vehicle according to the present inventions;

FIGS. 26 through 40 illustrate an isometric view of an optional embodiment that could make the present inventions more like a pick-up truck according to embodiments of the present inventions;

DETAILED DESCRIPTION OF THE PREFERRED EMBODIMENTS

Figure 4:
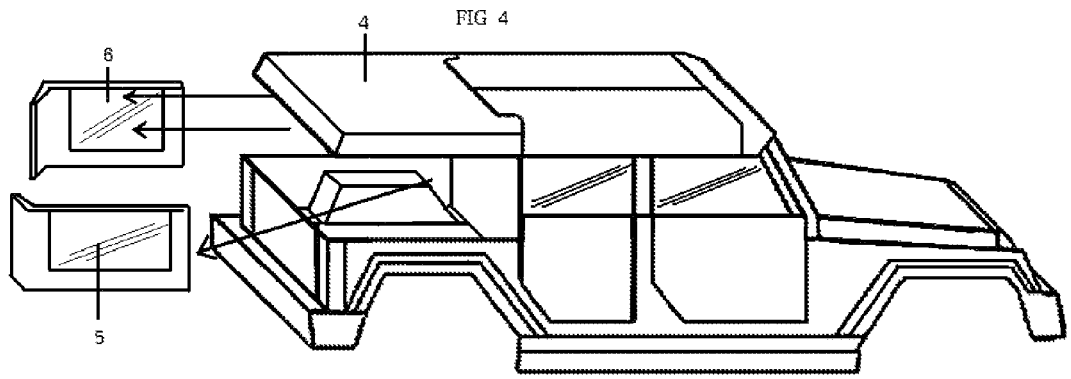
FIG. 4 illustrates a diagram of how the rear sides would remove, according to embodiments of the present inventions.

A top for a vehicle can be adjusted in elevation and can be removed from the vehicle. One advantage of the rear top in this patent is that it will let you store in the vehicle, a complete top made of a non-flexible hard surface material such as, metal, fiberglass, composite materials, etc. This type of top is referred to as removable hard top. This type of top can be used on many types of vehicles; utility vehicles, vans, pickups, station wagons, etc. Some tops are known to take the roof off, though none have the ability to take the whole roof sections off, and the choice of storing them in your garage or other building, or store them in a covered position, in the vehicle itself. With this patent you can remove top, side sections over the front doors, rear doors, and the cargo area, and the rear glass, and store all the parts in the rear covered area in the vehicle. Another advantage of this hard top is it has the same advantages of a soft top and none of the disadvantages such as; flapping, wind noise, tearing etc.

The roof parts themselves are stored under the hard surface cover that acts as a lockable trunk so your very expensive hard top is stored out of sight and under secure lockable hard cover. Also with the top stored in the covered area, there is still enough extra space to store valuables under the lockable cover.

The top is made into smaller sections, which makes each section weigh a lot less. This makes this top easy for one person to remove it by their self. All other tops, take three to four people, so most hard tops are rarely ever removed.

This invention is also made in such a way as to make it much quicker to take off and reinstall, even quicker and easier than current soft tops.

This invention is also unique in that the top rear roof section turns into a hard trunk cover which actually turns into a lockable security trunk. When the top, side and roof sections are not stored in the trunk area, you have storage comparable to the largest vehicle trunks on the market. This way you can also store valuables under the cover without concern of theft. The lowered rear hard top cover is opaque and makes the vehicle as secure as a vehicle with a standard trunk type. People will not be able to see inside the trunk, detouring thieves from looking twice. One concern with the old style tops is, when you remove the top, you have no safe place to store anything inside the vehicle, except in the console or glove box. Neither option is very large or secure. Even when considering utility vehicles with the hard metal roof. You can see inside the entire vehicle, giving you no security. Though some have the security covers, all thieves know if you have the cover pulled over, you probably have something under it of value, which leaves you vulnerable.

This invention is also unique in that the rear roof section can be divided into multiple parts, to accommodate the roll bars in its lowered position, This invention is also unique in that when the rear roof section is divided into two sections, the U-shaped rear section can also be used to cover a lowered soft top if desired.

This invention is unique in that it was designed with a rain gutter that also seals and locks the rear side sections for a good seal and a very smooth appearance.

Incorporated in this top is the added option of a half cab style top gaining the safe storage and the convenience of a truck. This half cab style configuration can have a lockable trunk space and the look of a pickup truck. Also with the half cab option you can remove the security cover on the back and install a separator to use this utility vehicle as a pickup bed, as will be described with respect to FIGS. 49 and 50. This option will gain all the conveniences of a pickup bed; such as hauling, picking up large cargo or maybe even towing a fifth wheel trailer.

Incorporated in this top is the added option of the rear roof section can also be a cover for a convertible top.

FIG. 1 illustrates an isometric view of a utility vehicle with the top on, in a normal manner. Item numbers 1 through 7 show the different sections of the top. Item 1 is the front section of the roof. In this embodiment item 1 is supported across its front most edge by the windshield frame and is supported at both drivers side and passenger side front corners by A pillars 31. Item 2 is the driver's side middle section of the roof. Item 2 is supported on its front edge by item 1, it is supported on its right side by item 3, it is supported on its left side by the driver's door and in the case of a four door, it is also supported by the rear driver's side door. Item 3 is the passenger side middle section of the roof. Item 3 is a mirror image of item 2. Item 4 is the rear upper roof section The rear upper roof section 4 is supported in front by, items 2 and 3, item 4 is supported on either left or right side by items 5 and 6. Item 5 is the passenger side rear section. In this embodiment item 5 consists of a C pillar 33 at its forward most edge, and a D pillar 34 at its rearward most edge. In this embodiment item 5 has a glass element between C pillar 33 and D pillar 34. This can be clear or opaque, of soft flexible material or of hard non-flexible material. Item 6 Is the passenger side rear section, which is a mirror image of section 5. Item 7 is the rear window. Which is supported by item 4 at its rearward most edge on a pivoting axis, with a removable pin or this can just be hung on an axis. Item 8 is the seam between the front section 1 and middle sections 2 and 3 this seam will be in difference locations on different body styles. Item 9 is the seam between left and right middle sections 2 and 3. Item 10 is the seam between middle sections 2 and 3 and rear top section 4. This seam will be in different locations on different body styles. Item 31 illustrates the front A pillar which supports the front of the roof on most vehicles. Item 32 illustrates the B pillar, which is present on most vehicles, supporting the sides of the roof. Item 33 illustrates the C pillar, which is present on most 2 door vehicles, which on 2 door vehicles would usually be the rear pillar. Item 34 illustrates the D pillar, which would support the rear of the roof on most four door vehicles. Item 35 illustrates the rear quarter panel. It could be called a rear fender also. The drawings in this example are of a Jeep Wrangler four door. Although this patent can be used on all types of vehicles such as; utility vehicles, vans, trucks or station wagon, it can be used on almost any vehicle type on the market. The roof sections are lift-off removable hard tops which are lifted off and removed by hand. These roof sections are preferably light weight enough to be lifted by the hand and arm of one person, but several persons can be used. In exceptional cases a hoist may be chosen to lift of the hard top sections, but no retractable or robotics attached to the vehicle are used to lift off the hard top sections. These lift-off removable hard tops can be stored in a garage when removed, but this requires garage space. They lift-off removable hard tops can be placed over and form the storage compartment. The latter is preferred because they can then travel with the vehicle and also secure the compartment.

FIG. 2 illustrates removing the rear window 7 out of the rear section of the top.

FIG. 3 illustrates the option of taking the rear window out and inserting it into a rear storage area 11 either between items 2 and 3 for a more secure fit or it could be stored on the bottom floor surface of the storage area. It could also be stored in a compartment created below items 5 and 6. Item 45 could also have brackets to hold the glass tucked up under the rear upper roof section 4. An alternate option is the window may be put into storage elsewhere.

FIG. 4 illustrates removing both right rear side 5, and left rear side 6, both side sections of the top.

Figure 5:
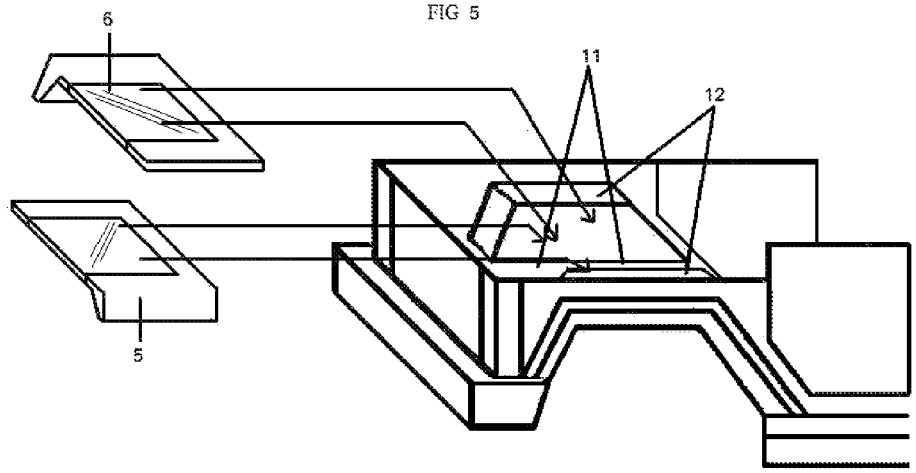
FIG. 5 illustrates a diagram of how the rear sides could be stored in the rear compartment, according to embodiments of the present inventions.

FIG. 5 illustrates a manner in which right rear side 5 and left rear side 6 could be stored in the vehicle, between the rear wheel wells 12, of the vehicle.

Figure 6:
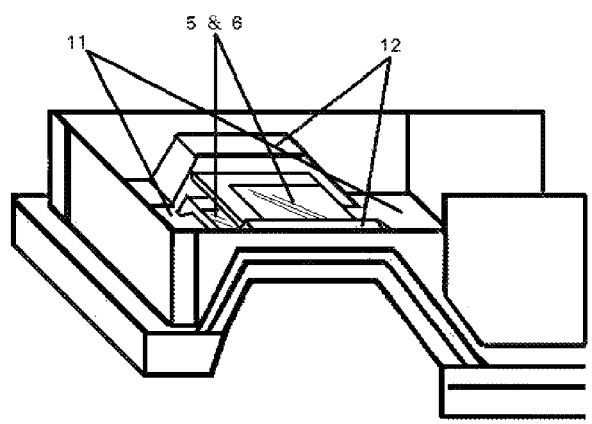
FIG. 6 illustrates a diagram of how the rear sides could be positioned in the rear compartment, according to embodiments of the present inventions.

FIG. 6 illustrates an image of how right rear side 5 and left rear side 6 could be positioned between rear wheel wells 12 of the vehicle, for storage. Or right rear side 5 and left rear side 6 could be stored elsewhere, storage, home, etc.

Figure 7:
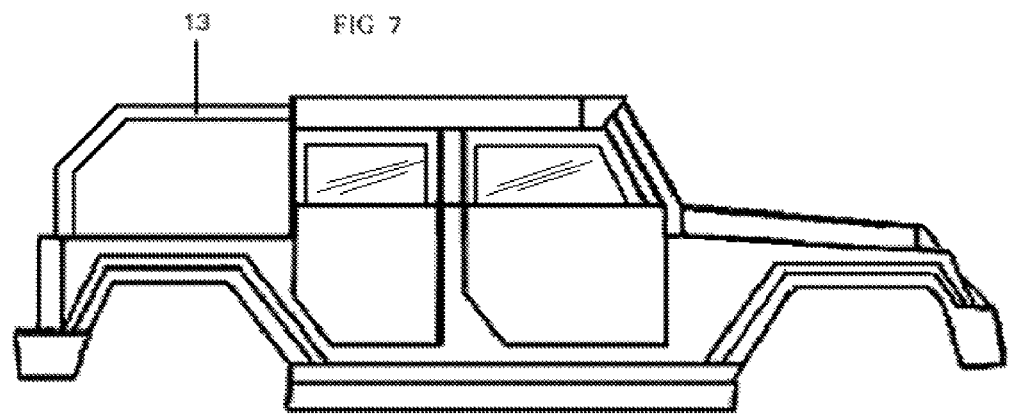
FIG. 7 illustrates the original position of the roll bar, according to embodiments of the present inventions.

FIG. 7 illustrates the roll bar in its factory original position 13. Before it was cut and relocated in its new location 14. Some body styles vehicles would require relocating the roll bar, some would not require this.

Figure 8:
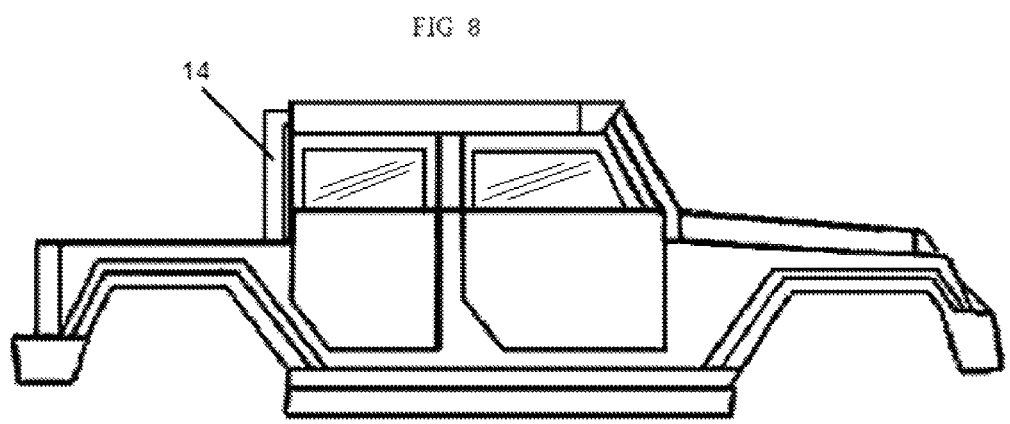
FIG. 8 illustrates how the roll bar could be cut and repositioned to accommodate the rear cover, according to embodiments of the present inventions.
Figure 10:
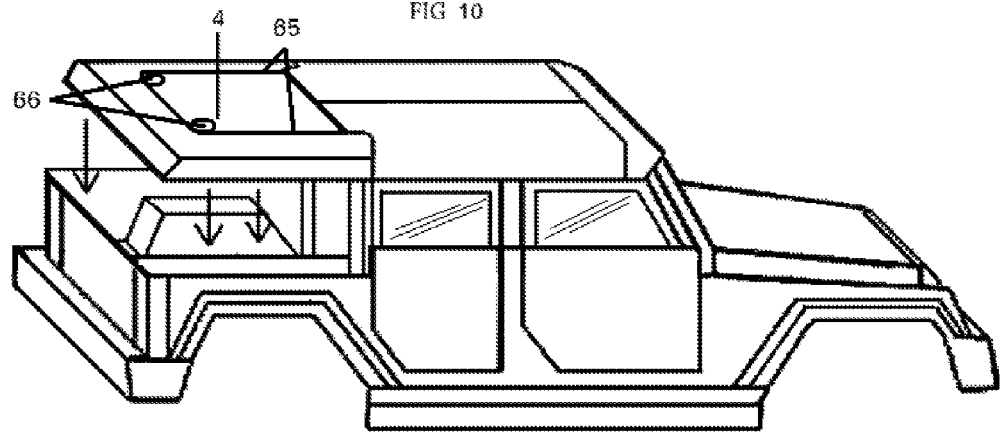
FIG. 10 illustrates a diagram of how the rear roof section could be moved down. Also in this embodiment the rear roof section could be made two part and incorporate holes to accommodate the roll bars according to embodiments of the present inventions.

FIG. 8 illustrates the roll bars 14 after cutting and modifying to the new style and location. In the case of the Jeep Wrangler, moving the roll bar was necessary to enlarge the storage area below roof section 4, to create a larger trunk space. This step is not necessary, the top could have holes to accommodate the roll bars, as illustrated in FIG. 10, number 65. In the case of the Jeep Wrangler two door, you would probably not cut the roll bar, you would just have a smaller covered area, or you could cut the roll bar and fold down the rear seat on the two door wrangler for more trunk space. Some body style vehicles would have a roll bar near this location, some would not.

Figure 9:
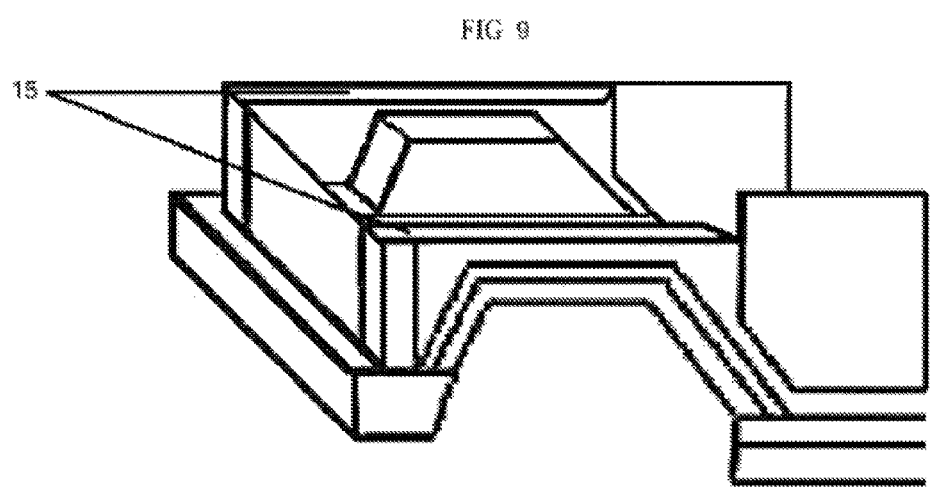
FIG. 9 illustrates a diagram of how the rear upper quarter panels would have to be widened in this embodiment to accommodate the rear roof cover, according to embodiments of the present inventions.

FIG. 9 illustrates where the upper sections of the rear quarter panels, of the vehicle, in this case, a Jeep Wrangler, would have to be widened to accommodate the fact that the rear upper roof section 4 is not wide enough to sit on the back of the vehicle without widening the rear upper quarter panel sections 15. Some body style vehicles would require this, some would not.

FIG. 10 illustrates how the rear roof section 4 would lower down into position, to become a functional locking security trunk cover. FIG. 10 also shows seam 65 illustrating an optional embodiment to make rear section 4 in two pieces to accommodate, for the roll bars if so desired. The holes numbered 66 are where the roll bars would pass through the rear upper roof section 4, illustrated in FIG. 46.

Figure 11:
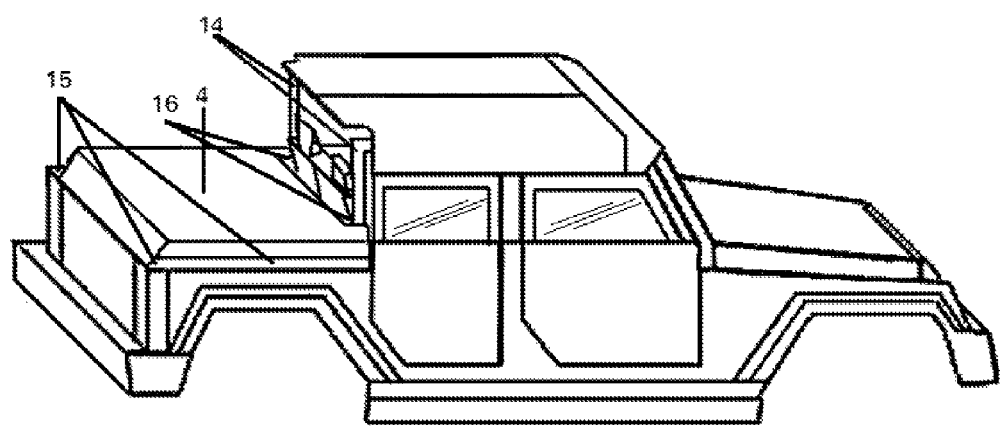
FIG. 11 illustrates a diagram of the top roof section in its lowered position and also shows how the rear roof section could be designed to fit around the rear seat and the roll bars according to embodiments of the present inventions.

FIG. 11 illustrates rear upper roof section 4, down in its lowered position, it would cover the roof sections 5 and 6 and rear window 7, with a secure cover. FIG. 11 also illustrates 16, showing how section 4 has been notched to fit around the rear seats and the roll bars 14. FIG. 11 also illustrates section 15, showing the space left over of the rear upper quarter panels, from the difference in width of the rear upper roof section 4 and the quarter panel sections 15. In the case of the Jeep Wrangler the top would fit snugly, so people could not see in the back area creating a secure trunk space to keep your belongings. This will also work on many types of other vehicles such as; utility vehicles, vans, pickups, station wagons, etc. The back section has been designed to make all the sections of the hardtop fit into this rear area, under roof section 4 so you can keep the top sections with you at all times if so desired. The big advantage to this rear upper roof section 4 covering the whole rear section, it virtually becomes a trunk area to keep valuables. In the case of all utility vehicles on the market today, you can see virtually into the whole vehicle, through the windows, leaving no security. If you go shopping, you cannot leave your belongings out, of concern of someone stealing them or your expensive top. Another advantage is, even if you have the top stored with you under the rear upper roof section 4, you still have extra storage area for your valuables under the secure covered area. The full hard top could be reinstalled anywhere at any time, for much greater convenience.

Figure 12:
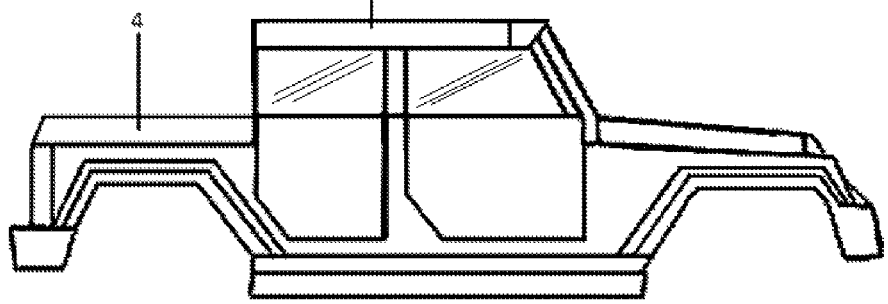
FIG. 12 illustrates a side view of how the vehicle would appear with the rear section down and the front roof sections up, according to embodiments of the present inventions.

FIG. 12 illustrates a side view with the top sections 2 and 3 still in position, with the rear upper roof section 4 lowered. This is one option that can be used with the middle sections up to keep the sun, cold air, rain etc., off the passengers, basically the way the bikini top is used, with the added security of a locking trunk.

Figure 13:
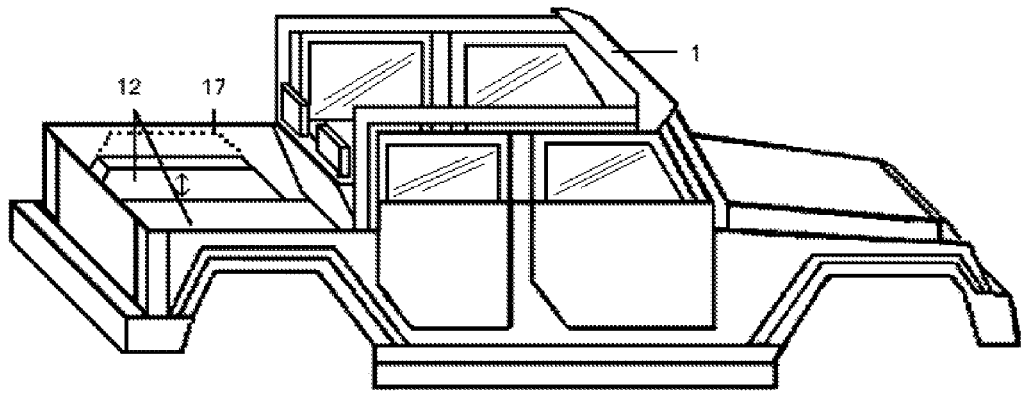
FIG. 13 illustrates a diagram of how the rear wheel wells had to be altered to accommodate the front roof sections, according to embodiments of the present inventions.

FIG. 13 illustrates how in the case, of the Jeep Wrangler the rear wheel wells 12, had to be cut down in height to accommodate the height of section 2 and 3, of the roof middle sections. These sections were cut specifically to accommodate all of the roof sections. Item 17 shows a dotted line of the original height of the rear wheel wells, FIG. 13 showing how, before and after rear wheel wells 12 were cut down to accommodate sections 2 and 3. FIG. 13 also shows in the case of the Jeep Wrangler four door, section 1 was added to shorten the length of sections 2 and 3, allowing them to fit in the rear storage area 11 of the vehicle on top of the rear wheel wells 12, and inside the rear quarter panel sections 15 of the vehicle.

Figure 14:
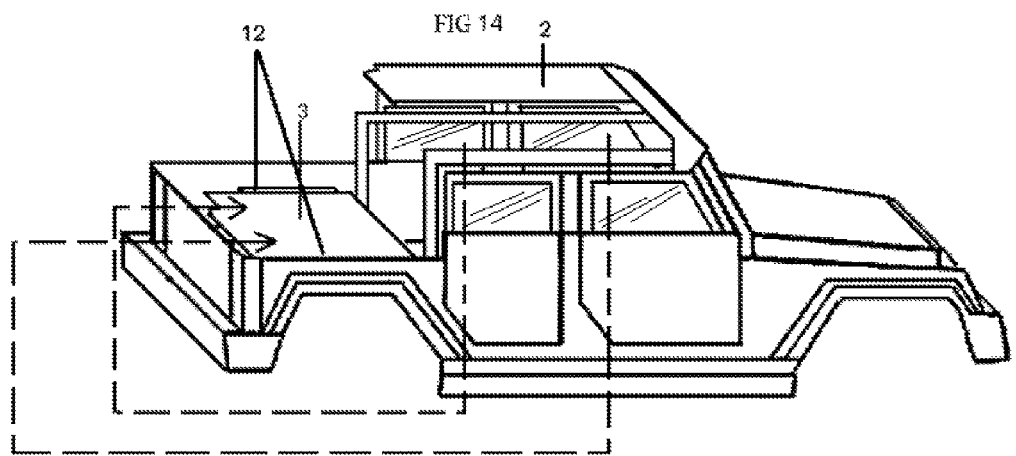
FIG. 14 illustrates how the passenger side roof section could store in the rear compartment on the rear wheel wells, according to embodiments of the present inventions.

FIG. 14 illustrates moving roof section 3 from its original position to the rear storage area 11 of the vehicle, on top of the rear wheel wells 12. Items 2 and 3 could be divided into four sections for different configurations, illustrated in FIG. 23.

Figure 15:
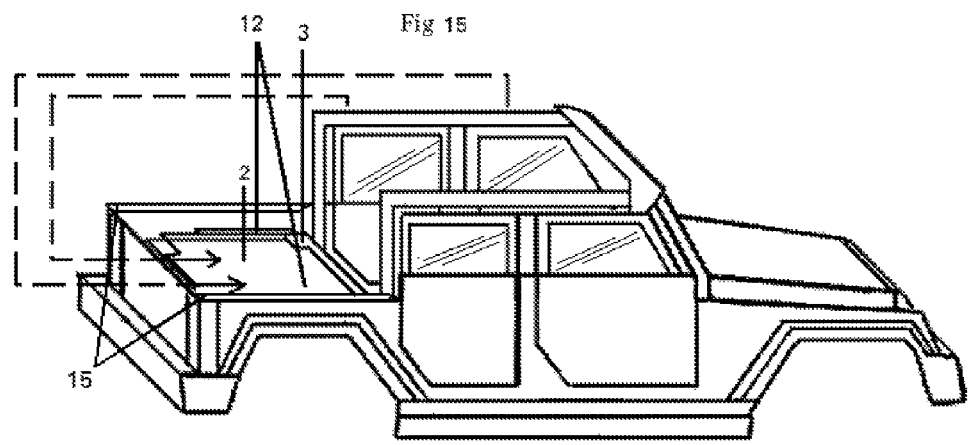
FIG. 15 illustrates how the driver's side roof section could be stored in the rear compartment, according to embodiments of the present inventions.

FIG. 15 illustrates moving roof section 2 from its original position into the rear storage 11, positioned above section 3, in a stacked manner above the rear wheel wells 12.

Figure 16:
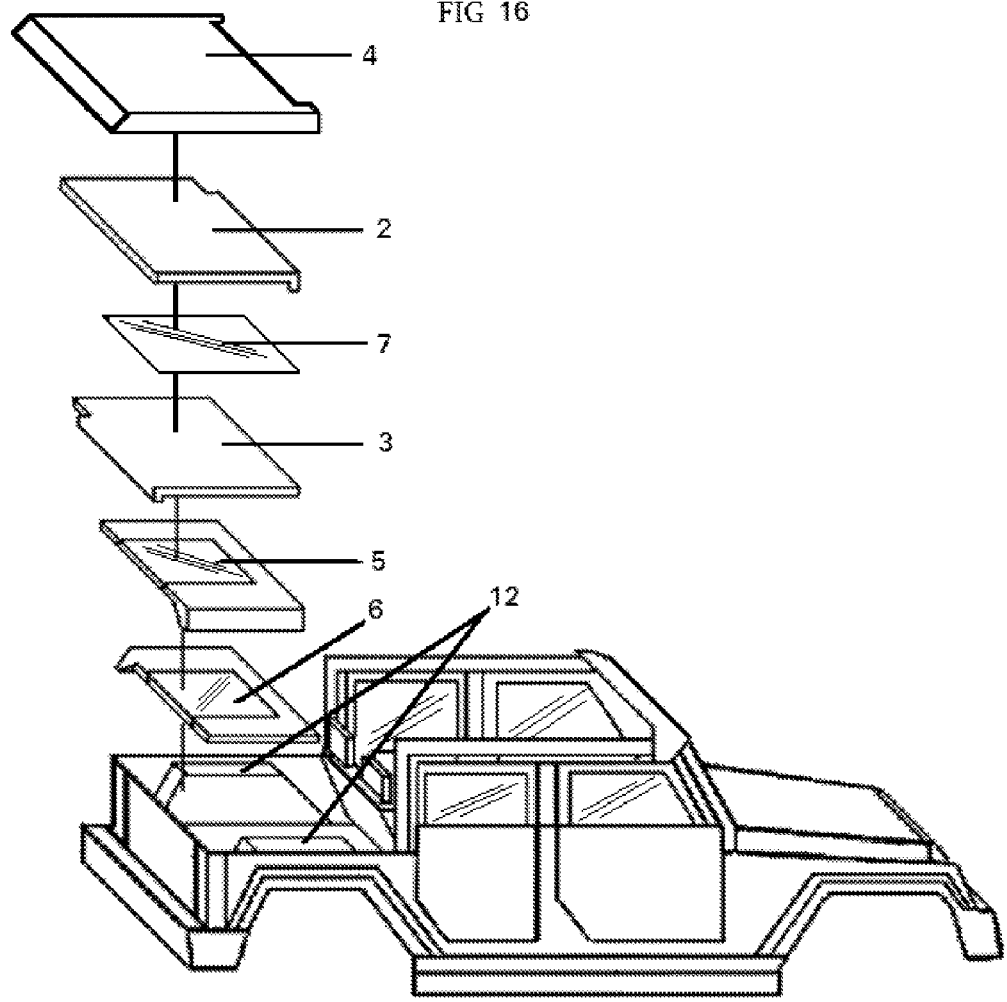
FIG. 16 illustrates a diagram, exampling how the roof sections could be positioned in the rear compartment under the cover, according to embodiments of the present inventions.

FIG. 16 illustrates one preferred order which all the sections would be stored under the roof section 4 in the rear of the vehicle, down between, and on top of the wheel wells 12. FIG. 16 also illustrates how the rear upper roof section 4 would move down and cover all of the roof sections to be stored securely. These could be stored in many configurations.

Figure 17:
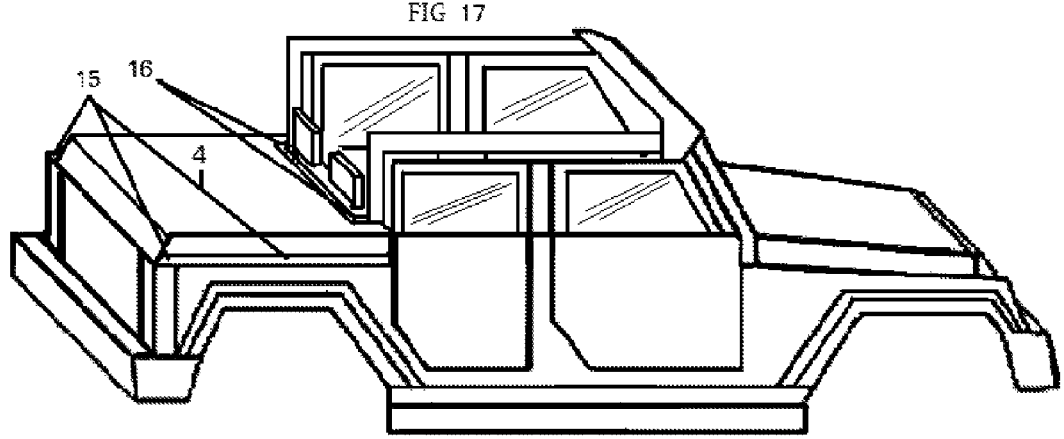
FIG. 17 illustrates how the rear section would look in its down position and how it is designed to fit around the rear seat and the roll bars, according to embodiments of the present inventions.

FIG. 17 illustrates with the rear upper roof section 4 down, all the top sections are stored below locking cover, this gives you the advantage of taking the top with you anywhere you go, with added security, and the advantage of reinstalling the top at any time, without concern of it being stolen. Another advantage of this cover is, even with all the top sections stored under the cover, you still have storage area below the rear upper roof section 4, for personal belongings. You can also store all the other top sections elsewhere, which would give you a very large trunk capacity for personal belongings. One big advantage to this top, is the sections are much smaller and lighter, so one person could disassemble this top. Most other tops take three to four people to remove them. Also having the smaller sections requires a lot less space to store the top, a big advantage for people living in apartments. Additionally you don't have to buy one of those special racks for storing the top or take up a parking space in your garage.

Figure 18:
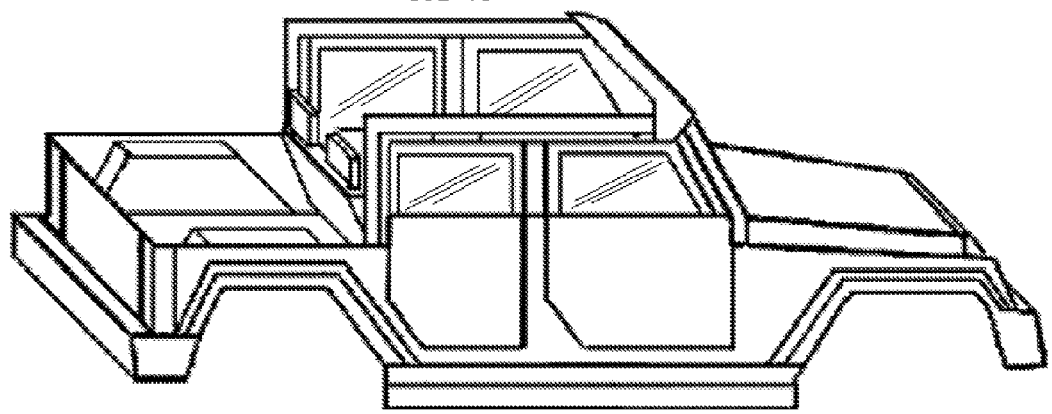
FIG. 18 illustrates with the complete removable hard top taken off the vehicle, according to embodiments of the present inventions.

FIG. 18 illustrates the vehicle without a top, and none of the parts stored in the rear section of the vehicle. This is an advantage in that if you want the top with you it can be. Some people will not want it with them when they are out four wheeling. As you can see, this makes the top much more versatile, giving many additional options.

Figure 19:
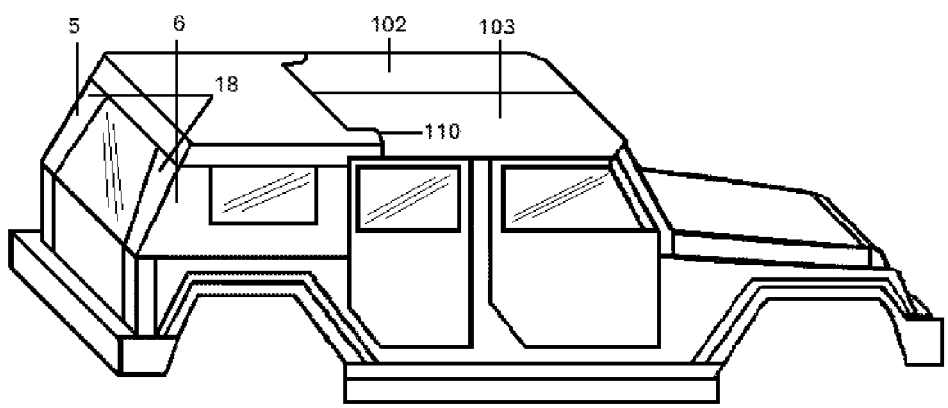
FIGS. 19 and 20 illustrate an optional embodiment that would be designed at a larger angle on the rear of the vehicle to allow the deletion of the front roof section, according to embodiments of the present inventions.
Figure 20:
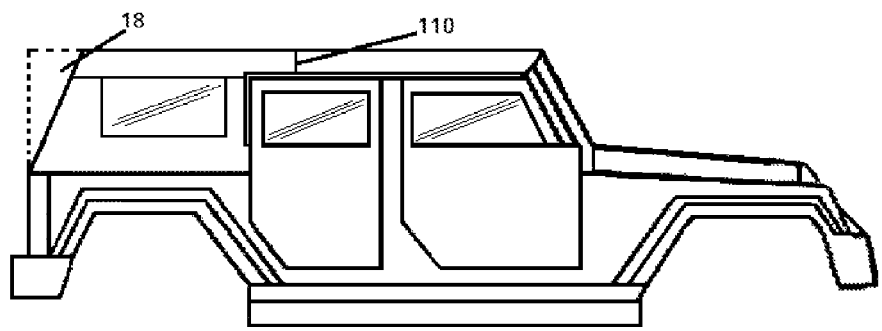

FIGS. 19 and 20 illustrate alternative embodiments for the rear. FIGS. 19 and 20 illustrate an option where section 1 could be eliminated just by cutting the rear areas of sections 5 and 6 at a bigger angle so sections 102 and 103 would move father forward and not require section 1, by moving seam 10 forward into position 110, to make up for the shorter length to fit under the rear quarter panel lips 15. Some vehicles on the market are already short enough, or at a big enough angle in their original design for this embodiment to be designed easily.

Figure 21:
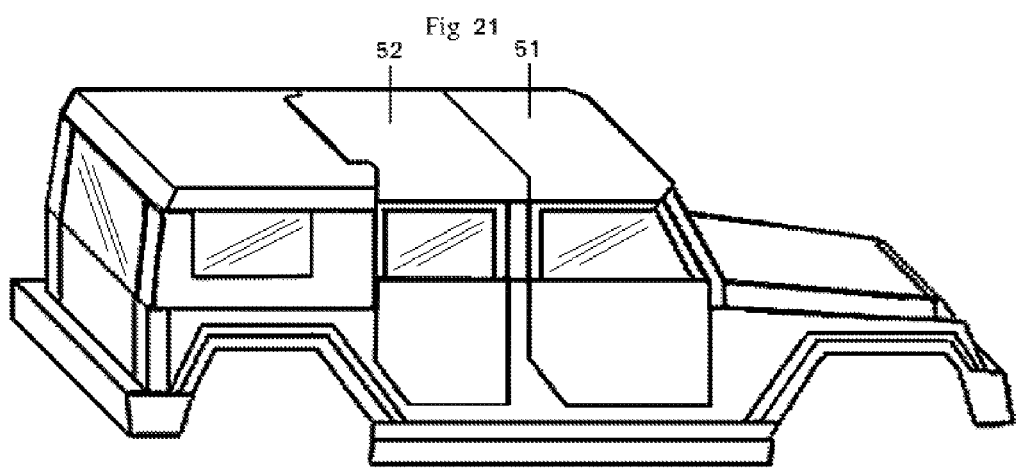
FIGS. 21 and 22 illustrate an embodiment that uses only one upper front section and one upper middle section, deleting small front section, according to the present inventions.
Figure 22:
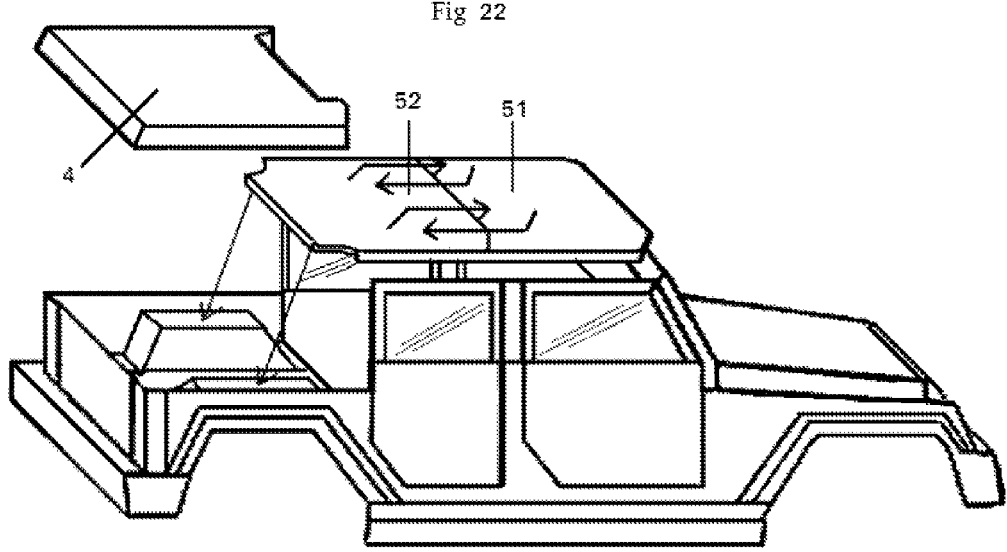

FIGS. 21 and 22 illustrate an alternative embedment with one upper front roof section 51, one upper middle roof section 52 and a upper rear roof section 4. In this alternate embodiment the sections could be moved manually.

Figure 23:
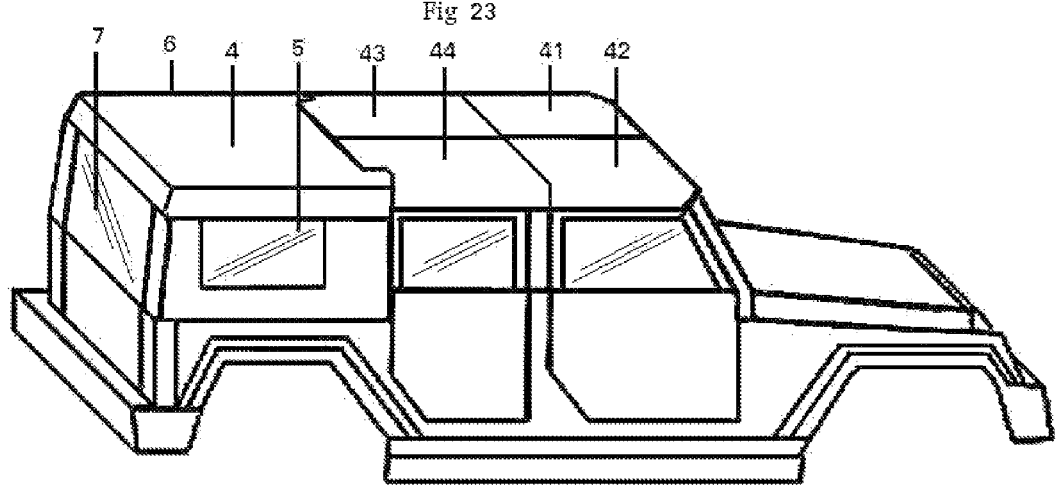
FIG. 23 through 25 illustrates an embodiment that uses 2 upper front sections and two upper middle sections, deleting small front section, according to the present inventions.

FIG. 23 illustrates in this embodiment sections 2 and 3 are divided into two pieces making four upper roof sections. Two upper front roof sections 41 and 42, and two upper middle roof sections 43 and 44. Also this configuration would not require front section 1. This embodiment could be used on FIGS. 1 through 18 for smaller front pieces if desired.

Figure 24:
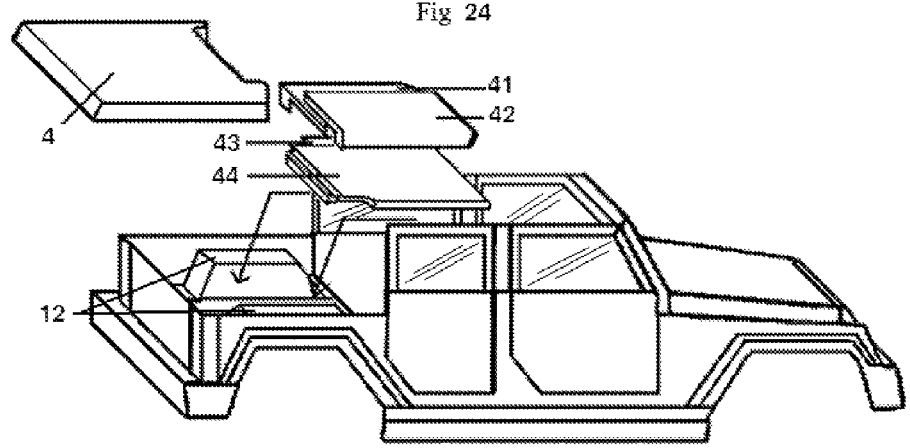

FIG. 24 illustrates how sections 41,42,43 and 44 would be in a stacked manner before moving manually down to the floor between the rear wheel wells 12.

Figure 25:
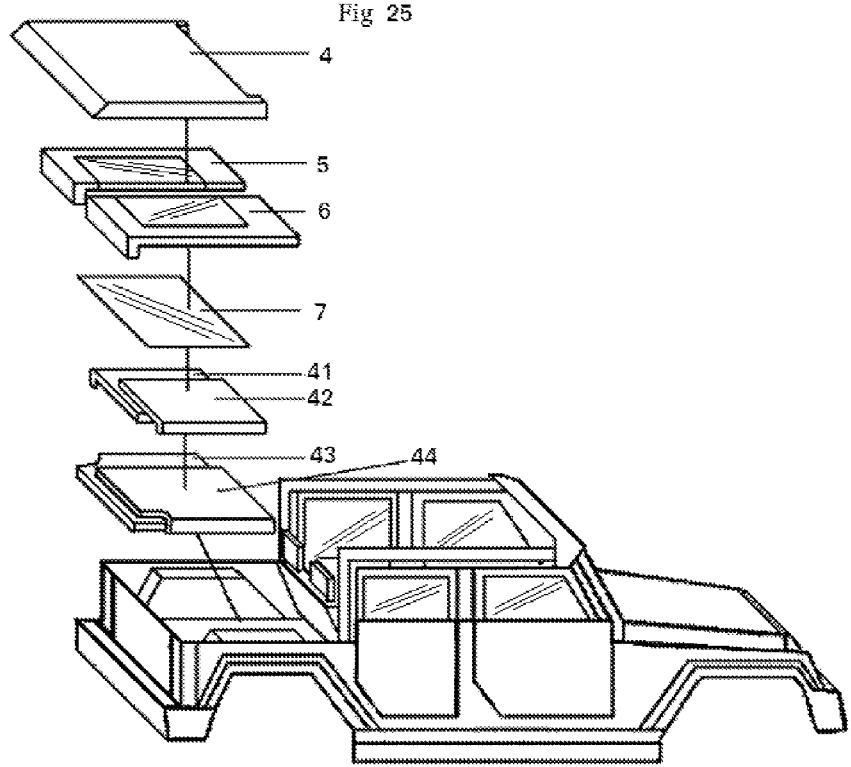

FIG. 25 illustrates the order all the roof sections could be stacked underneath the rear section 4.

FIGS. 26 through 40 illustrate alternative embodiments for the present inventions. FIGS. 26 through 40 illustrate an option that can be incorporated into this top if desired. The illustrations to follow illustrate an optional top designed to make the vehicle into a pickup, depending on the body style. This option can be incorporated into all types of vehicles such as; utility vehicles, vans, station wagons, etc.

Figure 26:
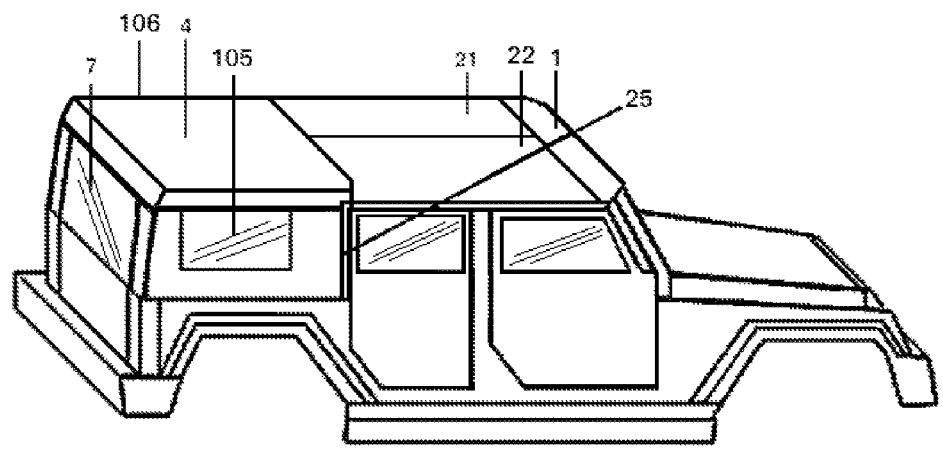

FIG. 26 is the same as FIG. 1 except the roof sections have a different configuration. Instead of having front section 1 and middle sections 2 and 3, FIG. 26 has front section 1 and middle sections 21 and 22, and rear side sections 105 and 106.

Figure 27:
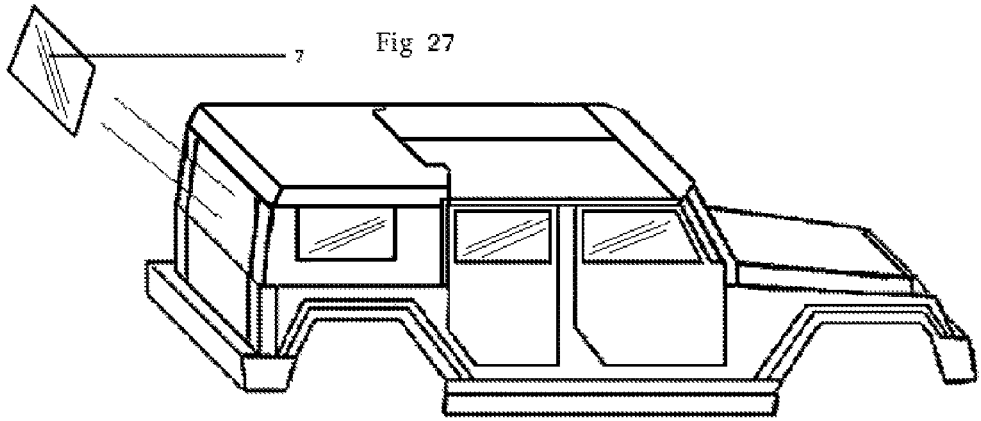

FIG. 27 illustrates removing the rear glass 7. In this configuration the glass would be put aside temporarily, to be repositioned later.

FIG. 28 illustrates removing both sides sections 105 and 106.

FIG. 29 illustrates removing rear top section 4. Sections 21, 22, 23 and 24, are the major difference in this embodiment option. FIG. 29 showing with the back sections 4, 105 and 106 removed, make the vehicle look like a pickup. In the case of the Jeep Wrangler four door, it would look like a four door pick up. Section 21, 22, 23 and 24 would be made with the rear window opening large enough so as to not obstruct rear view, while driving. In this embodiment, section or item 23 acts as the driver's side rear pillar, supporting the rearward most end of item 21, In this embodiment the item 23 is made thin enough to hide behind the roll bar so you would barely even see it while driving to have clear visibility out the rear of the vehicle. Item 24 would be a mirror image of 23. Items 23 and 24 could be made permanent if desired. This option could work on most body style vehicles.

Figure 30:
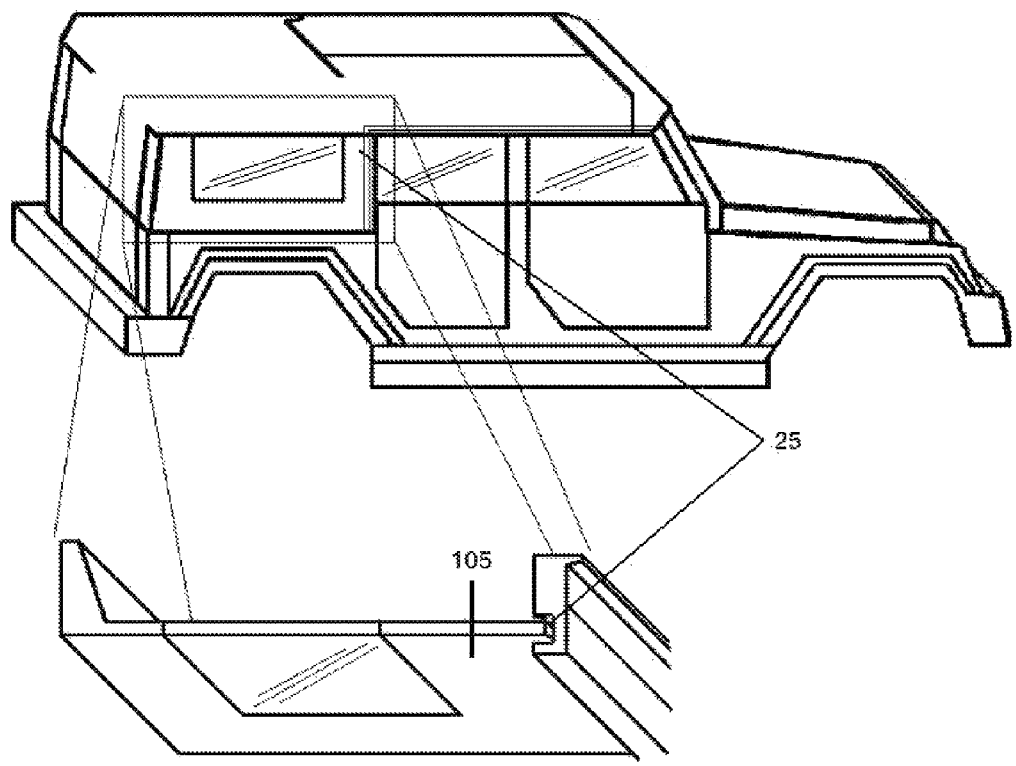

FIG. 30 illustrates how in this option, the side sections 105 and 106 would lock into the newly created lower rain gutter or side seal 25. Rain gutter 25 would preferably be a dual purpose rain gutter and groove/seal for locking both side sections 105 and 106. FIG. 25 also shows an over the top view of either side 105 or 106, how it would lock into the rain gutter. The advantage of this newly created side rain gutter or, side seal 25, is it will seal and lock in position both side sections 105 and 106, and it will hide the seam on the sides of the top, for a very clean look. This would not be required. The sides 105 and 106 could be locked in, in many other manners.

Figure 31:
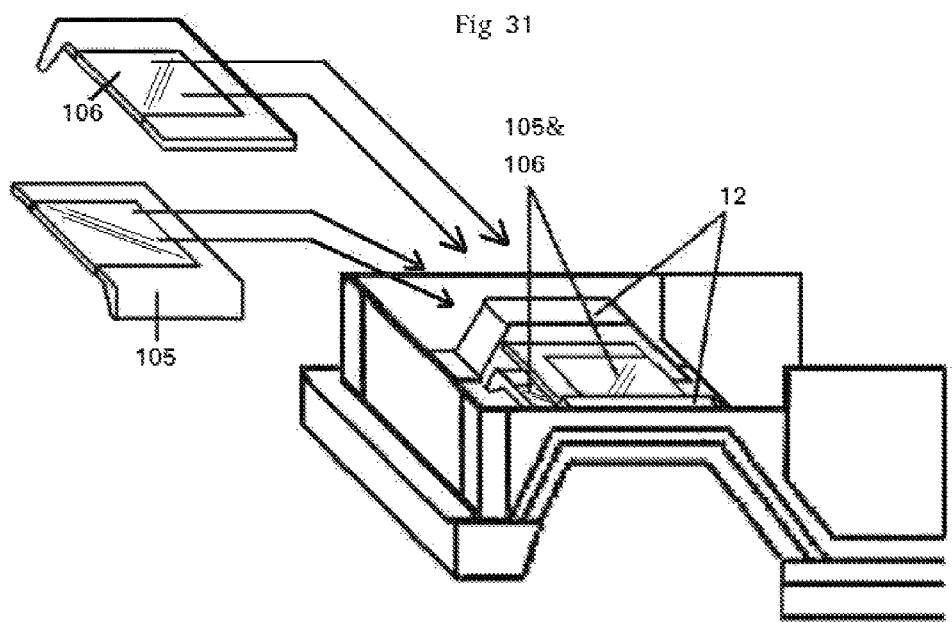

FIG. 31 illustrates where sections 105 and 106 could be stored between rear wheel wells 12.

FIG. 32 illustrates how the vehicle would appear with the top sections 21, 22, 23 and 24 on and the rear cover 4 removed. And the side sections 105 and 106 stored between the wheel wells 12. FIG. 32 also shows 15 the larger upper rear quarter panel surface, to accommodate rear cover 4.

FIG. 33 illustrates how rear cover 4 would set on top of the sections 15, and slide into section 23 and 24, where they are notched 26.

FIG. 34 illustrates section 4 installed into sections 23 and 24 sealed nicely into notch 26.

Figure 35:
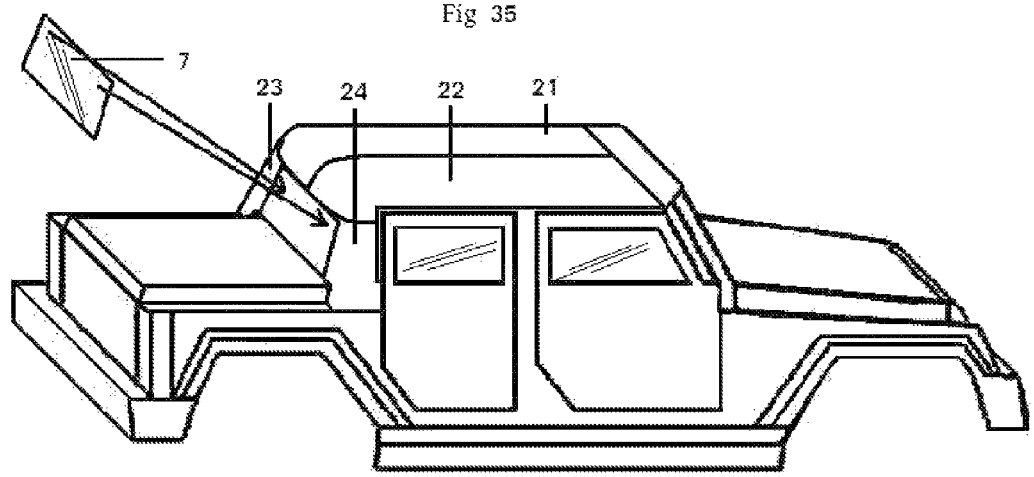

FIG. 35 illustrates how the rear window 7 would install into sections 21, 22, 23 and 24. Section 23 and 24 in this case were designed, so rear glass 7 or window 7 would fit both the rear configurations 4,105, and 106 as illustrated in FIGS. 26 and 27. Rear glass 7 or rear window 7 can also fit into sections 21, 22, 23 and 24, so you do not have to have two different pieces of glass for each of the windows.

Figure 36:
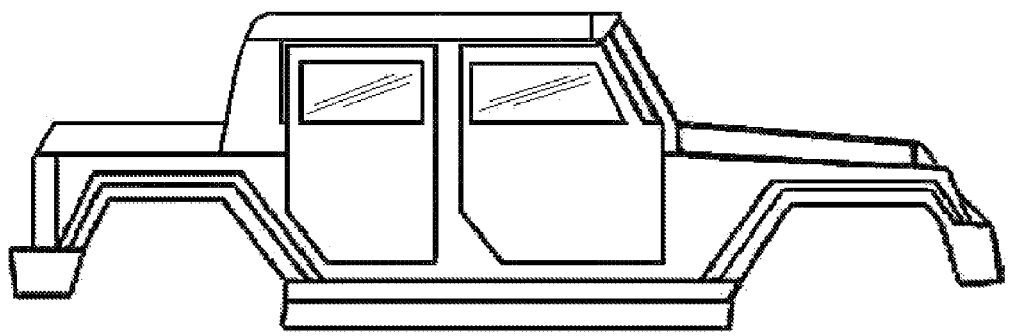

FIG. 36 illustrates a side view with sections 21, 22, 23, 24 and 4 installed, making the vehicle look like a four door pick up. In this configuration you also have a locking trunk for security.

Figure 37:
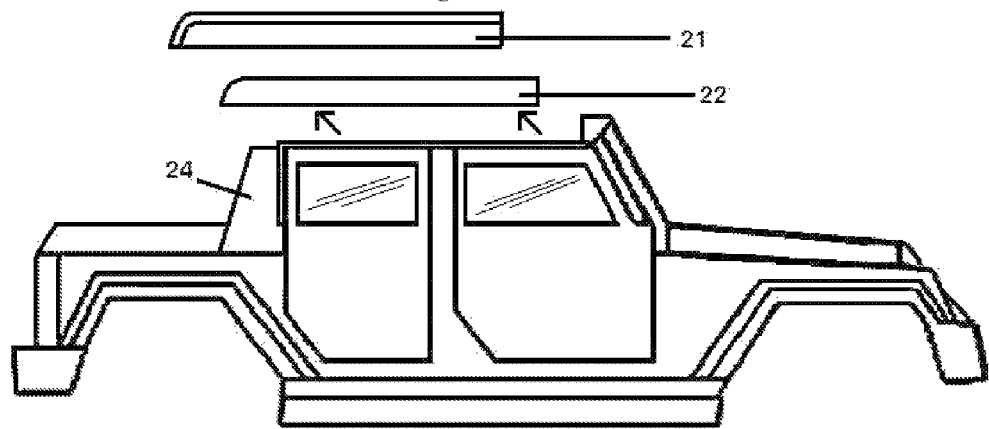

FIG. 37 illustrates removing middle roof sections 21 and 22, and storing them in rear storage compartment 11, or elsewhere such as garage, storage etc.

Figure 38:
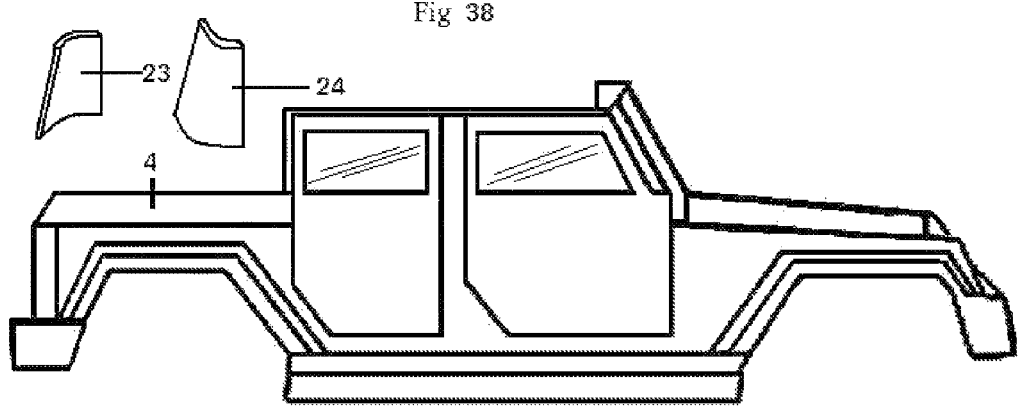

FIG. 38 illustrates removing sections 23 and 24, and storing in rear storage compartment 11, or elsewhere. These could be mad stationary if desired.

Figure 39:
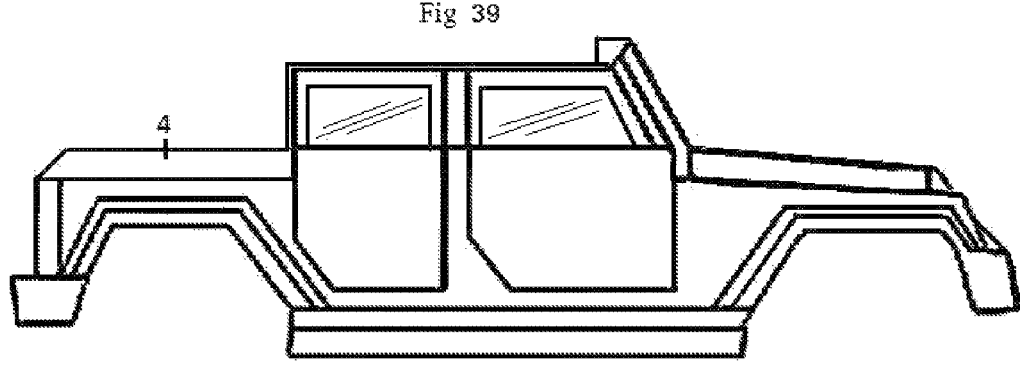

FIG. 39 illustrates all the middle sections 21, 22, 23 and 24, removed and rear cover 4 installed. With rear cover 4 still on, you could have the top stored underneath, and have some lockable storage, or you could store the roof sections elsewhere and have a very large trunk space.

Figure 40:
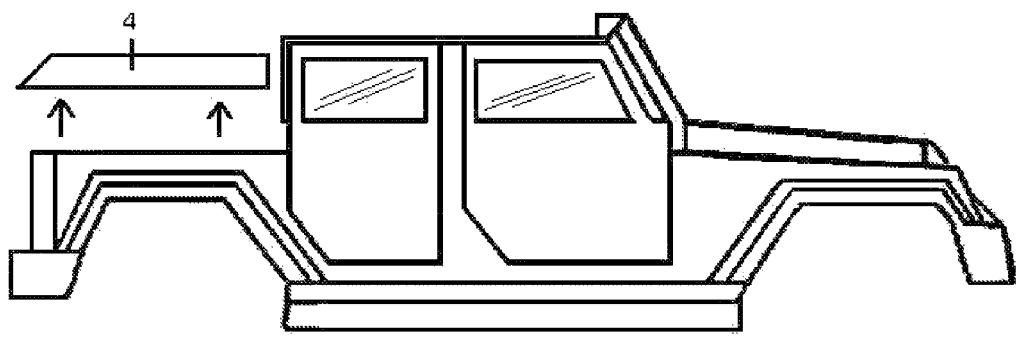

FIG. 40 illustrates with rear cover removed and the vehicle with no top installed.

Figure 41:
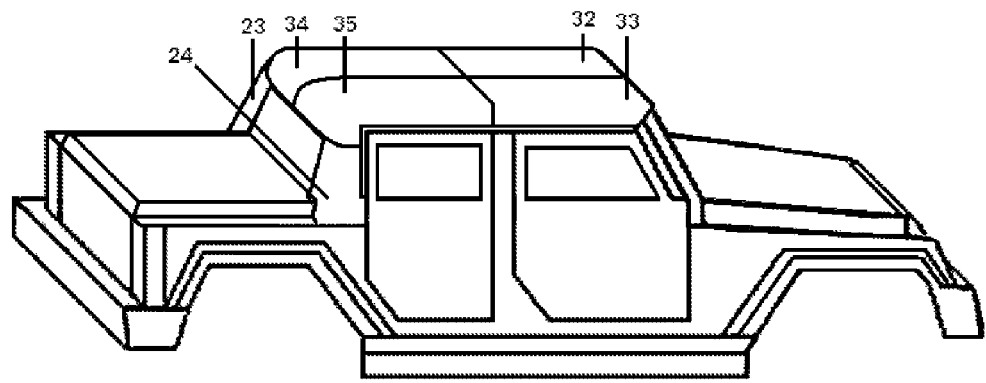
FIG. 41 illustrates an embodiment that appears like a pick-up with two front roof sections and two middle roof and two rear pillar sections, according to the present inventions.

FIG. 41 illustrates an alternate embodiment that would divide sections 1, 21 and 22 into sections, 32, 33, 34 and 35. In this embodiment the sections 32, 33, 34 and 35 would be smaller, for easier lifting if desired. Other than that it would be basically like FIGS. 26 through 40.

Figure 42:
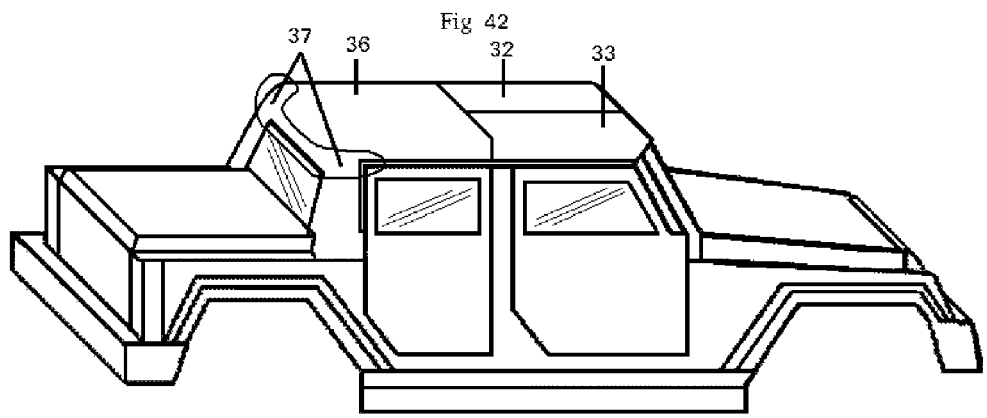
FIG. 42 illustrates an embodiment that appears like a pick-up, with only two front sections and one middle section, having no seam on the rear corners of the cab, according to the present inventions.

FIG. 42 illustrates alternative embodiments for the rear upper roof to be shaped like a pick-up truck. FIG. 42 illustrates an option that could be used, where both front sections 32 and 33 would be, in the case of a Jeep Wrangler four door removable hard top. The top in this case could incorporate the factory front sections 32 and 33, and newly created section 36 to function and appear like a pickup truck. In illustration 37 you can see there would be no seam. Other than that, it would work pretty much be configured like FIGS. 26 through 40.

FIGS. 43 through 46 illustrate alternative embodiments for a removable hard top. FIGS. 43 through 46 illustrate how the top could be designed for the two door, so you could fold the rear seat down, or leave it up if desired.

Figure 43:
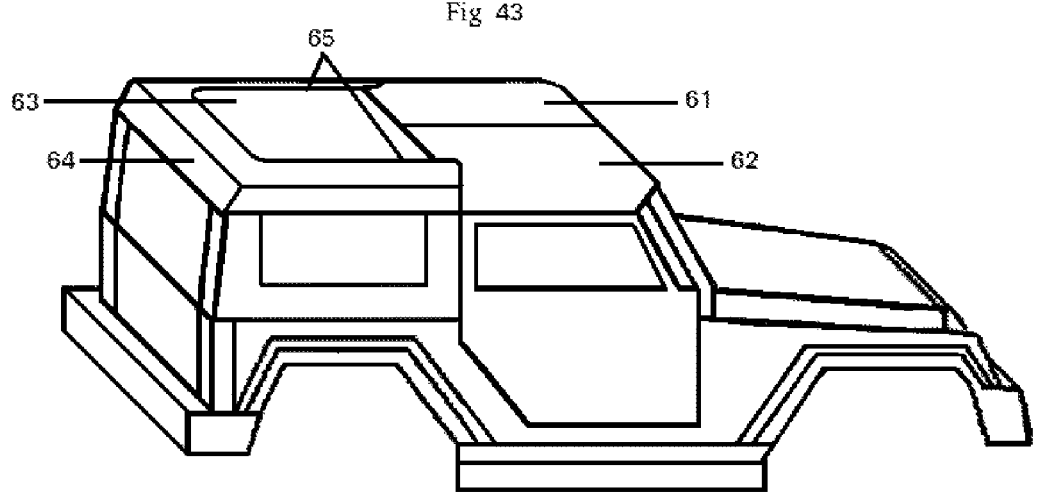
FIGS. 43 through 46 illustrate an embodiment showing how the rear roof section could be divided into two section and could be made to accommodate a roll bar or not, according to the present inventions.

FIG. 43 illustrates how the top would look in its up position. There would be two front sections 61 and 62, In this embodiment section 4 would now become sections 63 and 64, on the two or four door model.

Figure 44:
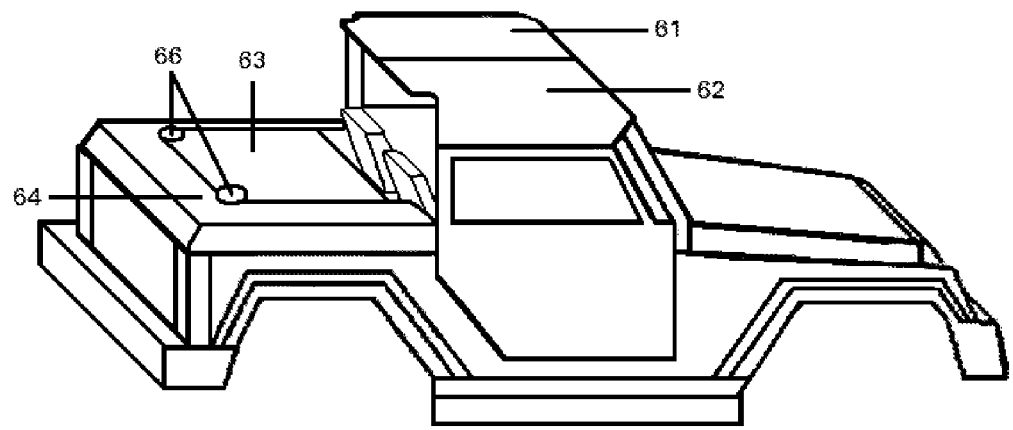

FIG. 44 illustrates with sections 63 and 64 in their down position with the rear seat folded forward and down. Sections 63 and 64 would cover the rear seat. FIG. 44 also shows if you wanted the roll bar in its original position how there would be holes in the rear top, the roll bar could also be made to fold down. This design could be used on a two door and four door style vehicle.

Figure 45:
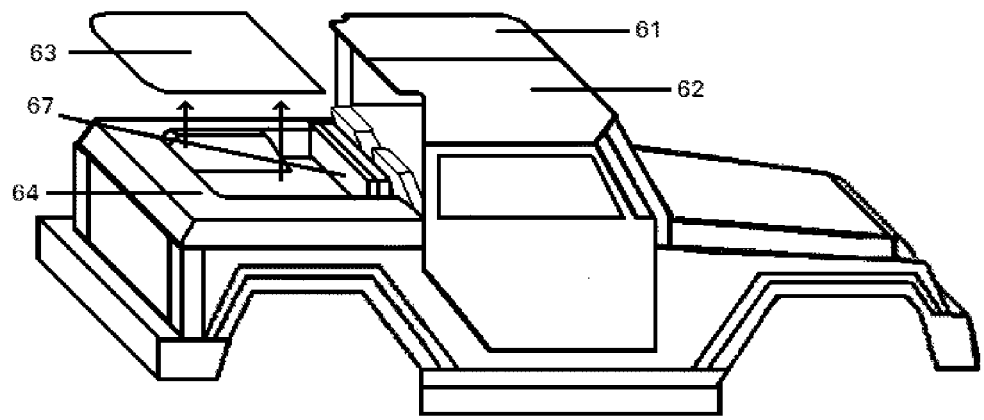

FIG. 45 illustrates if you were to remove section 63. You can see how the rear seat 67 can be folded forward and down, to be out of the way of section 63.

Figure 46:
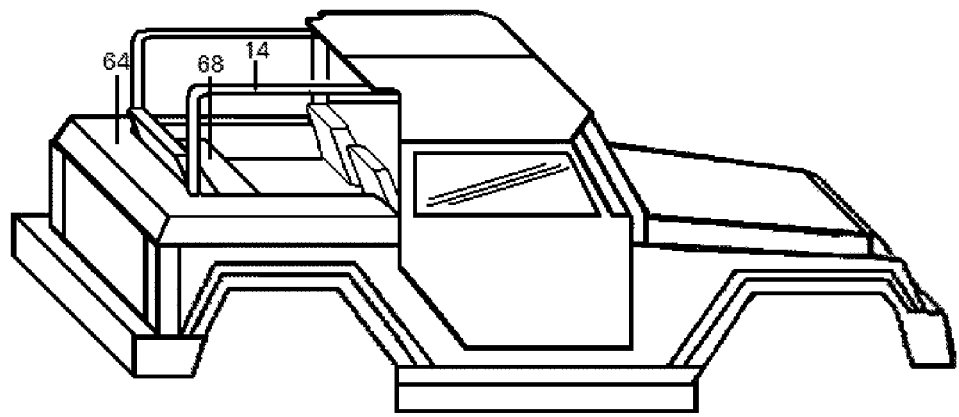

FIG. 46 illustrates with section 63 removed and the rear seat folded up, allowing people to sit in the rear seat 67, and still have a trunk area for your valuables. In this embodiment it shows how the roll bar could be left in its original position or it could be cut like in FIG. 8. Both styles would work.

Figure 47:
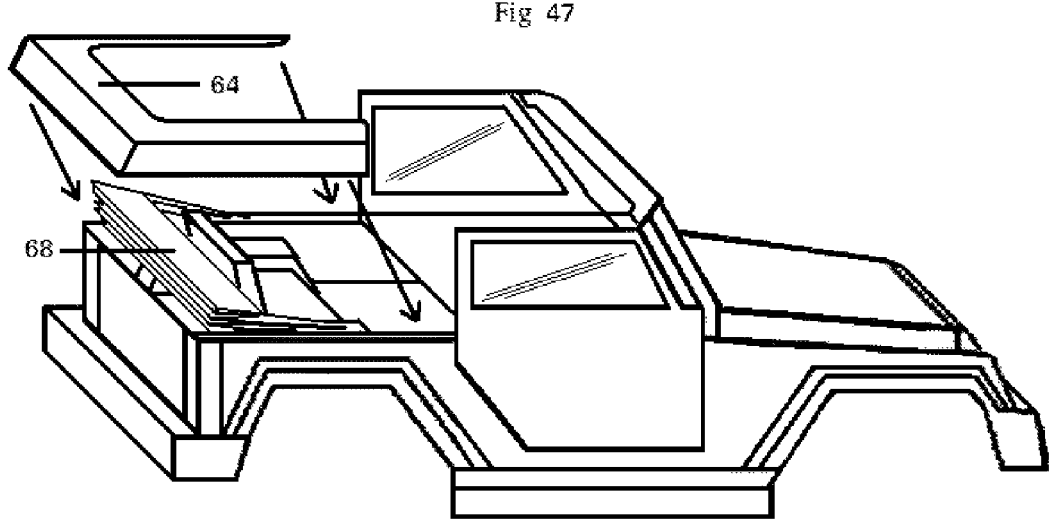
FIG. 47 illustrates in this embodiment how the rear roof section was designed to also be a hard cover for a soft top, according to the present inventions.

FIG. 47 illustrates a perspective view of an alternative embodiment showing how section 64 of the rear section of the hard top could also be used as a cover for the soft top on a four door or a two door vehicle. This could be designed a little wider to come all the way to the edge of rear quarter panel 35, to cover all of section 15.

Figure 48:
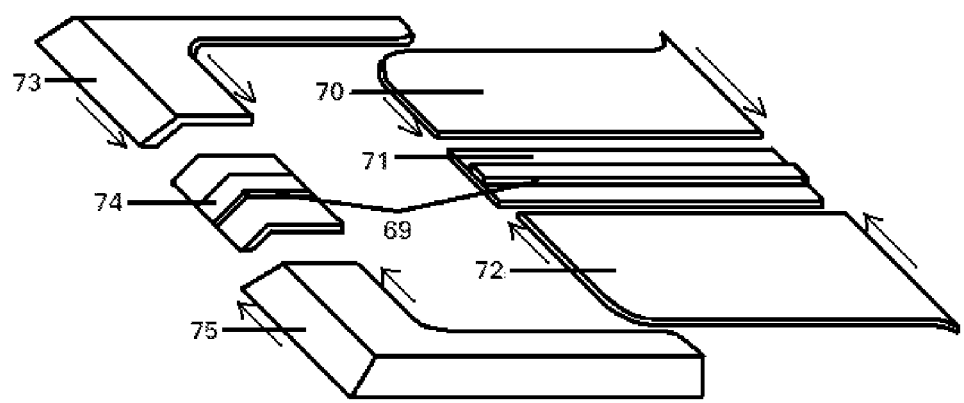
FIG. 48 illustrates a diagram of another embodiment of the rear roof top, and how it could be divided into multiple sections to accommodate the width of a vehicle, according to the present inventions.

FIG. 48 illustrates another embodiment where the rear roof section 4, in FIG. 1, or roof section 64 in FIGS. 43 through 46, could be divided into multiple sections to accommodate making the rear cover wider or thinner. 74 could act as a spacer between 73 and 75. 71 could act as a spacer between 70 and 72.

Figure 49:
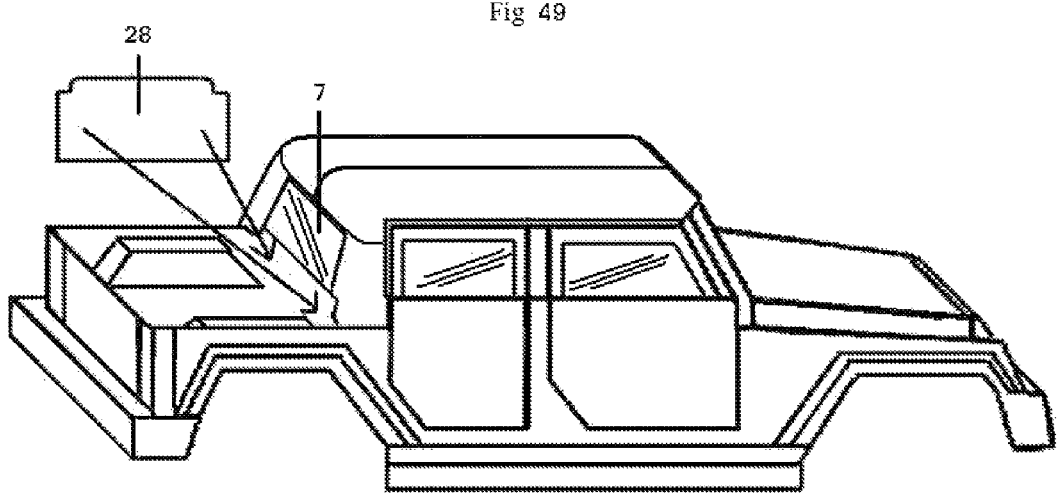
FIGS. 49 and 50 illustrate a diagram of an optional divider that could be positioned between the rear of the cab and the storage compartment, according to embodiments of the present inventions.
Figure 50:
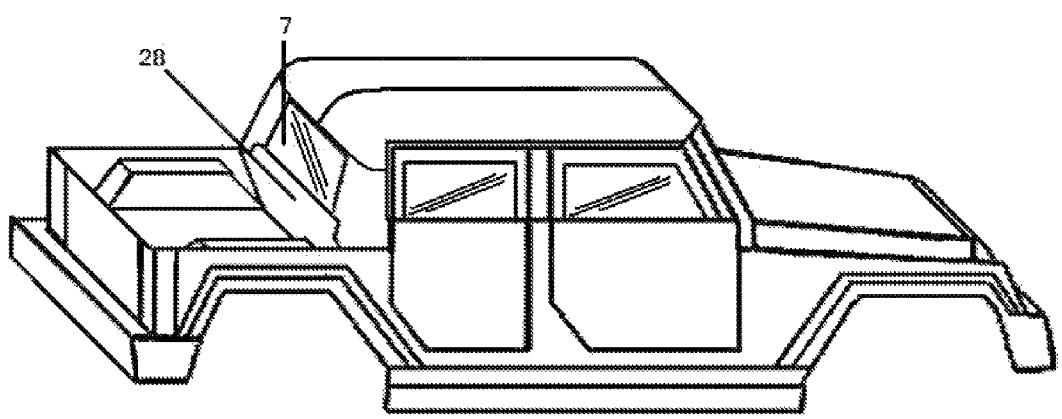

FIGS. 49 and 50 illustrates divider 28, an alternate embodiment for the rear to function more like a pick-up bed. 28 separates the seating area from the bed area for hauling or just sealing the cab.

Although the exemplary embodiments show rear roof sections becoming the cover over the rear storage compartment, any of the roof sections including the front section can become the cover.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. A vehicle body with a multiple elevation roof capable of driving with the roof present or removed, comprising:
    a vehicle body comprising a passenger compartment and two rear quarter panel sides partially enclosing a rear of the vehicle body in corresponding left and right positions;
    a pair of lift-off removable side sections, each of the lift-off removable side sections having bottom surfaces capable of setting on and connecting to respective top surfaces of respective ones of the two rear quarter panel sides and further enclosing the rear of the vehicle body in corresponding left and right positions; and
    a lift-off removable hard rooftop comprising at least first and second roof sections, wherein one or more of the roof sections are capable of setting upon and connecting to the top surfaces of said pair of lift off removable side sections and top surfaces of said two rear quarter panel sides;
    wherein when at least one of the roof sections sits upon the top surfaces of said pair of lift-off removable side sections, the pair of lift-off removable side sections connects to at least one of the roof sections at a first elevation above a level of the passenger compartment and at least one section of the first and second roof sections is over at least a portion of the passenger compartment;
    wherein when at least the first roof section sets upon the top surfaces of said two rear quarter panel sides, the rear quarter panel sides connect to said lift-off removable hard rooftop at a second elevation substantially beneath a level of the first elevation; and
    wherein a storage compartment is created between at least the first roof section and the pair of rear quarter panel sides, said storage compartment having dimensions capable of holding at least said pair of removable side sections when at least the first roof section sets upon the top surfaces of said two rear quarter panel sides.

2. A vehicle body according to claim 1, wherein each of said lift-off removable side sections comprises a load-bearing pillar.

3. A vehicle body according to claim 2,
    wherein each of said lift-off removable side sections further comprise a window glass; and
    wherein the load-bearing pillar is near one end.

4. A vehicle body according to claim 3, wherein the window glass is secured between the load-bearing pillar and another load-bearing pillar, the another load-bearing pillar being at an end opposite the one end.

5. A vehicle body according to claim 1,
    wherein at least one section of the lift-off removable hard rooftop comprises a lift-off removable hard front rooftop over a front portion of the passenger compartment;
    wherein at least one or more other section of the lift-off removable hard rooftop comprises a lift-off removable hard rear rooftop; and
    wherein the at least one or more other section of the lift-off removable hard front rooftop is sized with a longest dimension no longer than a longest dimension of said storage compartment.

6. A vehicle body according to claim 5, wherein the lift-off removable hard front rooftop comprises a removable hard front rooftop of at least two pieces split by a seam running between a front and a back of the vehicle body.

7. A vehicle body according to claim 5, wherein the lift-off removable hard front rooftop comprises a removable hard front rooftop of at least two pieces split by a seam running between a drivers side and a passengers side of the vehicle body.

8. A vehicle body according to claim 5, wherein the lift-off removable hard front rooftop is comprised of at least four pieces split lengthwise and across.

9. A vehicle body according to claim 5, wherein the lift-off removable hard front rooftop further comprises a roof top section across a windshield permitting a shortening of the longest dimension of the lift-off removable hard front rooftop.

10. A vehicle body according to claim 1,
    wherein the lift-off removable hard front rooftop sections are stored within said storage compartment over wheel wells of said rear quarter panel sides and beneath a rear section of the lift-off removable hard rooftop; and
    wherein said pair of lift-off removable side sections and said removable rear glass for the vehicle body are stored within said storage compartment between the wheel wells of said rear quarter panel sides and beneath the lift-off removable hard front rooftop sections.

11. A vehicle body according to claim 1, wherein the storage compartment created underneath the lift-off removable hard rooftop and between the pair of rear quarter panel sides further has dimensions capable of holding at least said pair of removable side sections and the lift-off removable hard rooftop and a removable rear glass for the vehicle body.

12. A vehicle body according to claim 11,
wherein each of the two rear quarter panel sides comprise a respective wheel well; and
wherein at least the lift-off removable side sections are stored within said storage compartment between the wheel wells of said rear quarter panel sides.

13. A vehicle body according to claim 12, wherein the lift-off removable hard rooftop and the removable rear glass for the vehicle body are stored above the wheel wells.

14. A vehicle body according to claim 1, wherein said storage compartment is a lockable storage compartment including a lockable connection between said lift-off removable hard rooftop and the vehicle body.

15. A vehicle body according to claim 10, wherein said storage compartment including the lift-off removable rear rooftop is opaque to deter theft.

16. A vehicle body according to claim 5, wherein the hard rear rooftop is one section.

17. A vehicle body according to claim 1, wherein the vehicle body further comprises a removable rear glass for the vehicle body capable of being disposed at a rear of the vehicle body between the hard rear rooftop and rear ends of each of the pair of lift-off removable side sections when the hard rear rooftop is at the first elevation, and capable of being disposed near a middle of the vehicle body behind the passenger compartment between the front rooftop and ends opposite the rear ends of each of the pair of rear quarter panels when said hard rear rooftop is at the second elevation or removed.

18. A vehicle body according to claim 1, wherein the vehicle body further comprises a rain gutter configured of a size and position to hold, seal and lock onto the lift-off removable side sections when set in said rain gutter.

19. A vehicle body according to claim 1, wherein the hard rear rooftop comprises two sections, a first U-shaped section and a second section fitting within the U.

20. A vehicle body according to claim 1, wherein at least the first and second roof sections of the lift-off removable hard rooftop are separable from all other of the roof sections.

21. A vehicle body according to claim 1, further comprising a driver's side rear pillar and a passenger's side rear pillar extending between respective ones of the two rear quarter panel sides and at least one section of the lift-off removable hard rooftop when the at least one section of the lift-off removable hard rooftop is at the first elevation and another section of the lift-off removable hard rooftop is at the second elevation.

22. A vehicle body according to claim 1, wherein said pair of lift off removable side sections and the lift-off removable hard rooftop are made of a non-flexible material.

23. A vehicle body with a multiple elevation roof capable of driving with the roof present or removed, comprising:
a vehicle body comprising a passenger compartment and two rear quarter panel sides partially enclosing a rear of the vehicle body in corresponding left and right positions;
a pair of lift-off removable side sections, each of the lift-off removable side sections having bottom surfaces capable of setting on and connecting to respective top surfaces of respective ones of the two rear quarter panel sides and further enclosing the rear of the vehicle body in corresponding left and right positions; and
a lift-off removable hard rooftop comprising at least first and second roof sections, wherein one or more of the roof sections are capable of setting upon and connecting to the top surfaces of said pair of lift off removable side sections and top surfaces of said two rear quarter panel sides;
wherein when at least one of the roof sections sits upon the top surfaces of said pair of lift-off removable side sections, the pair of lift-off removable side sections connects to at least one of roof sections at a first elevation above a level of the passenger compartment;
wherein when at least the first roof sections sets upon the top surfaces of said two rear quarter panel sides, the rear quarter panel sides connect to said lift-off removable hard rooftop at a second elevation substantially beneath a level of the first elevation; and
wherein a storage compartment is created between at least the first roof section and the pair of rear quarter panel sides, said storage compartment having dimensions capable of holding at least said pair of removable side sections when at least the first roof section sets upon the top surfaces of said two rear quarter panel sides; and
wherein the vehicle body further comprises a rear glass capable of being disposed at a rear of the vehicle between the hard rear rooftop and rear ends of each of the pair of lift-off removable side sections when the hard rear rooftop is at the first elevation, and capable of being disposed near a middle of the vehicle body behind the passenger compartment between the front rooftop and ends opposite the rear ends of each of the pair of rear quarter panels when said hard rear rooftop is at the second elevation or removed.

24. A vehicle body according to claim 23, wherein the vehicle body further comprises a divider capable of being disposed near a middle of the vehicle body below the rear glass, behind the passenger compartment and between forward ends of each of the pair of rear quarter panel sides when the said hard rear rooftop is at the second elevation or removed.

25. A vehicle body with multiple elevation roof capable of driving with the roof present or removed, comprising:
a vehicle body comprising a passenger compartment and two rear quarter panel sides partially enclosing a rear of the vehicle body in corresponding left and right positions;
a pair of lift-off removable side sections, each of the lift-off removable side sections having bottom surfaces capable of setting on and connecting to respective top surfaces of respective ones of the two rear quarter panel sides and further enclosing the rear of the vehicle body in corresponding left and right positions; and
a lift-off removable hard rooftop comprising at least first and second roof sections, wherein one or more of the roof sections are capable of setting upon and connecting to the top surfaces of said pair of lift off removable side sections and top surfaces of said two rear quarter panel sides;
wherein when at least one of the roof sections sits upon the top surfaces of said pair of lift-off removable side sections, the pair of lift-off removable side sections connects to at least one of roof sections at a first elevation above a level of the passenger compartment;
wherein when at least the first roof sections sets upon the top surfaces of said two rear quarter panel sides, the rear quarter panel sides connect to said lift-off removable hard rooftop at a second elevation substantially beneath a level of the first elevation; and wherein a storage compartment is created between at least the first roof section and the pair of rear quarter panel sides, said storage compartment having dimensions capable of holding at least said pair of removable side sections when at least the first roof section sets upon the top surfaces of said two rear quarter panel sides; and wherein the vehicle body further comprises a rain gutter configured of a size and position to hold, seal and lock onto the lift-off removable side sections when set in said rain gutter.

26. A vehicle body with multiple elevation roof capable of driving with the roof present or removed, comprising:

a vehicle body comprising a passenger compartment and two rear quarter panel sides partially enclosing a rear of the vehicle body in corresponding left and right positions;

a pair of lift-off removable side sections, each of the lift-off removable side sections having bottom surfaces capable of setting on and connecting to respective top surfaces of respective ones of the two rear quarter panel sides and further enclosing the rear of the vehicle body in corresponding left and right positions; and a lift-off removable hard rooftop comprising at least first and second roof sections, wherein one or more of the roof sections are capable of setting upon and connecting to the top surfaces of said pair of lift off removable side sections and top surfaces of said two rear quarter panel sides;

wherein when at least one of the roof sections sits upon the top surfaces of said pair of lift-off removable side sections, the pair of lift-off removable side sections connects to at least one of roof sections at a first elevation above a level of the passenger compartment;

wherein when at least the first roof sections sets upon the top surfaces of said two rear quarter panel sides, the rear quarter panel sides connect to said lift-off removable hard rooftop at a second elevation substantially beneath a level of the first elevation; and wherein a storage compartment is created between at least the first roof section and the pair of rear quarter panel sides, said storage compartment having dimensions capable of holding at least said pair of removable side sections when at least the first roof section sets upon the top surfaces of said two rear quarter panel sides; and wherein the hard rear rooftop comprises two sections, a first U-shaped section and a second section fitting within the U.

27. A vehicle body according to claim 26, wherein the first U-shaped section of the hard rear rooftop comprises three sections including two L shaped sections, one being a right angle and one being a left angle, and an I shaped middle section; and wherein the second section of the hard rear rooftop comprises three more pieces comprising of a left piece, a right piece and a middle piece, all three sections fitting within the middle of the U.

28. A vehicle body according to claim 26, wherein at least one of said two pieces fit around seats.

29. A vehicle body according to claim 26, wherein the first U-shaped piece forms a cover for an open positioned soft top.

30. A vehicle body according to claim 29, wherein the first U-shaped piece has a size and configuration to reach over and cover a top of both rear quarter panel sections to edges thereof.

* * * * *